United States Patent
Khaled et al.

(10) Patent No.: US 10,844,502 B2
(45) Date of Patent: Nov. 24, 2020

(54) ELECTRODE AND AN ELECTROCHEMICAL CELL FOR PRODUCING PROPANOL FROM CARBON DIOXIDE

(71) Applicant: King Fahd University of Petroleum and Minerals, Dhahran (SA)

(72) Inventors: Mazen Mohamed Khaled, Dhahran (SA); Ramadan Abdelmonem Geioushy, Dhahran (SA); Khalid Alhooshani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 56 days.

(21) Appl. No.: 15/841,031

(22) Filed: Dec. 13, 2017

(65) Prior Publication Data

US 2019/0177863 A1    Jun. 13, 2019

(51) Int. Cl.
| | |
|---|---|
| *C25B 11/04* | (2006.01) |
| *C25B 3/04* | (2006.01) |
| *B01D 21/26* | (2006.01) |
| *C25B 9/06* | (2006.01) |

(52) U.S. Cl.
CPC ........ *C25B 11/0484* (2013.01); *B01D 21/262* (2013.01); *C25B 3/04* (2013.01); *C25B 9/06* (2013.01); *C25B 11/0405* (2013.01); *C25B 11/0478* (2013.01)

(58) Field of Classification Search
CPC ........... C25B 3/04; C25B 11/00; C25B 11/04; C25B 11/0405; C25B 11/0442; C25B 11/0478; C25B 11/0484; C25B 11/12; B01J 23/06; B01J 23/72
See application file for complete search history.

(56) References Cited

U.S. PATENT DOCUMENTS

| | | |
|---|---|---|
| 2011/0147205 A1 | 6/2011 | Guay et al. |
| 2013/0256123 A1 | 10/2013 | Rahman et al. |

FOREIGN PATENT DOCUMENTS

| | | |
|---|---|---|
| WO | 2015/108596 A2 | 7/2015 |
| WO | 2015/108596 A3 | 7/2015 |
| WO | 2016/054400 A1 | 4/2016 |

OTHER PUBLICATIONS

Lashgari et al ("Photocatalytic back-conversion of $CO_2$ into oxygenate fuels using an efficient ZnO/CuO/carbon nanotube solar-energy-material: Artificial photosynthesis", Journal of CO2 Utilization, 18 (Mar. 2017), (Year: 2017).*

(Continued)

*Primary Examiner* — Alexander W Keeling
(74) *Attorney, Agent, or Firm* — Oblon, McClelland, Maier & Neustadt, L.L.P.

(57) ABSTRACT

An electrode with a conductive substrate and an electrocatalyst comprising zinc oxide and copper oxide supported on a carbon nanomaterial, a method of fabricating the electrode, an electrochemical cell that utilizes the electrode as a working electrode, and a process for producing propanol from $CO_2$ with the electrochemical cell. Various combinations of embodiments of the electrode and the method of fabricating thereof, the electrochemical cell, and the process for producing propanol from $CO_2$ is provided.

19 Claims, 16 Drawing Sheets

(56) References Cited

OTHER PUBLICATIONS

Schwartz et al ("Carbon Dioxide Reduction to Alcohols using Perovskite-Type Electrocatalysts", Journal of the Electrochemical Society, vol. 140, No. 3, Mar. 1993) (Year: 1993).*
Huang et al ("The effect of gold on the copper-zinc oxides catalyst during the partial oxidation of methanol reaction", International Journal of Hydrogen Energy, vol. 36, Issue 23, Nov. 2011, pp. 15203-15211 (Year: 2011).*
Deerattrakul et al ("CO2 hydrogenation to methanol using Cu—Zn catalyst supported on reduced graphene oxide nanosheets", Journal of CO2 Utilization, vol. 16, Dec. 2016, pp. 104-113) (Year: 2016).*
Ren et al ("Tuning the Selectivity of Carbon Dioxide Electroreduction toward Ethanol on Oxide-Derived CuxZn Catalysts", ACS Catalysis, 2016, 6, pp. 8239-8247). (Year: 2016).*
Ramadan et al ("The Effects of Voltage and Concentration of Sodium Bicarbonate on Electrochemical Synthesis of Ethanol from Carbon Dioxide Using Brass as Cathode", Journal of Physics: Conference Series, vol. 909, conference 1, Jul. 2017). (Year: 2017).*
Rosen et al ("Electrodeposited Zn Dendrites with Enhanced CO Selectivity for Electrocatalytic CO2 Reduction", ACS Catalysis, 2015, 5, 8, pp. 4586-4591) (Year: 2015).*
Himanshu Singh, et al., "Electrodeposition of porous copper as a substrate for electrocatalytic material", Journal of Electroanalytical Chemistry, vol. 765, Jan. 15, 2017, pp. 1-7.
Jonathan Albo, et al., "$Cu_2O$-loaded gas diffusion electrodes for the continuous electrochemical reduction of $CO_2$ to methanol", Journal of Catalysis, vol. 343, 2016, pp. 232-239.
Y. Hori, et al., "Electrochemical reduction of carbon dioxide at various series of copper single crystal electrodes", Journal of Molecular Catalysis A: Chemical, vol. 199, 2003, pp. 39-47.
Yun Huang et al., Electrochemical Reduction of $CO_2$ Using Copper Single-Crystal Surfaces: Effects of CO Coverage on the Selective Formation of Ethylene, ACS Catalysis, 2017, pp. 1749-1756.
Dan Ren, et al., "Mechanistic Insights miss the Enhanced Activity and Stability of Agglomerated Cu Nanotrystals for the Electrochemical Reduction of Carbon Dioxide to n-Propanol", The Journal of Physical Chemistry Letters, vol. 7, Dec. 10, 2015, pp. 20-24.
Christina W. Li, "Electroreduction of carbon monoxide to liquid fuel on oxide-derived nanocrystalline copper", Macmillan Publishers Limited, 2014, pp. 1-17.
R.A. Geioushy, et al., "Graphene/ZnO/Cu2O electrocatalyst for selective conversion of CO2 into n-propanol", Electrochimica Acta, vol. 245, May 31, 2017, pp. 456-462.

* cited by examiner

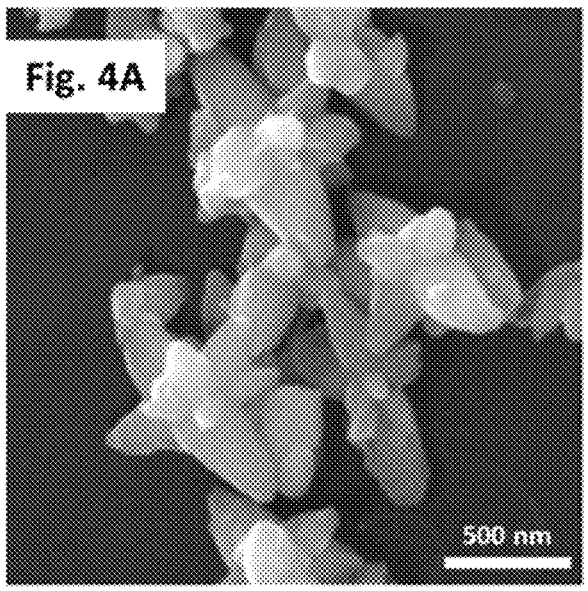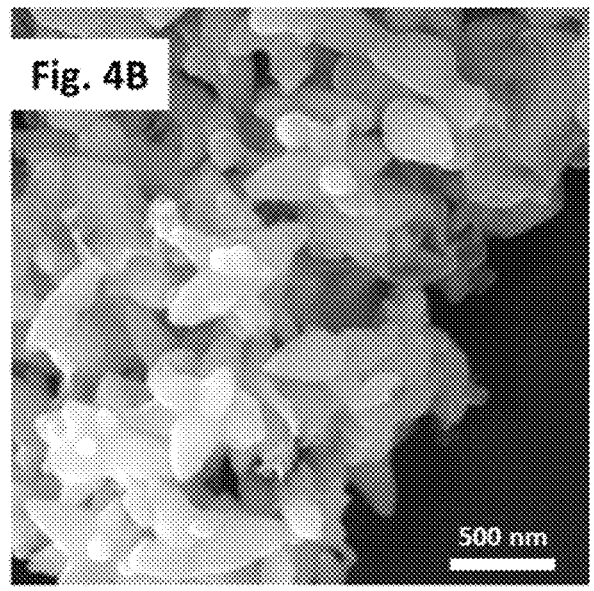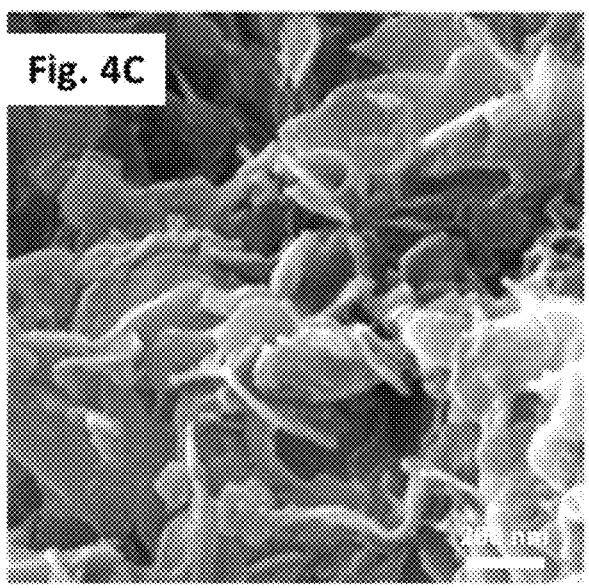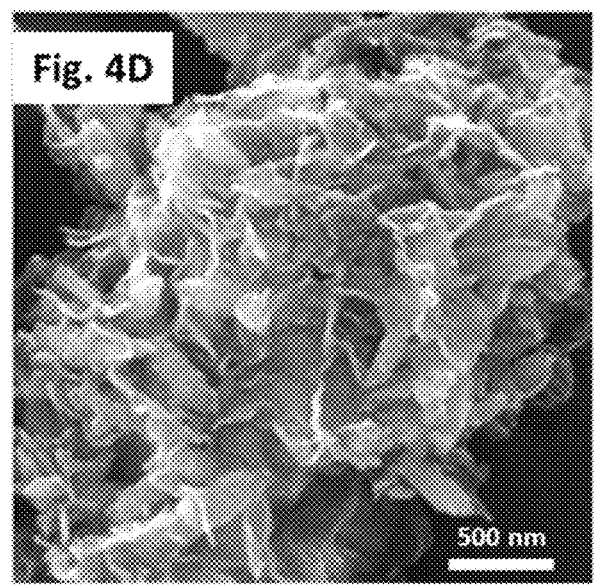

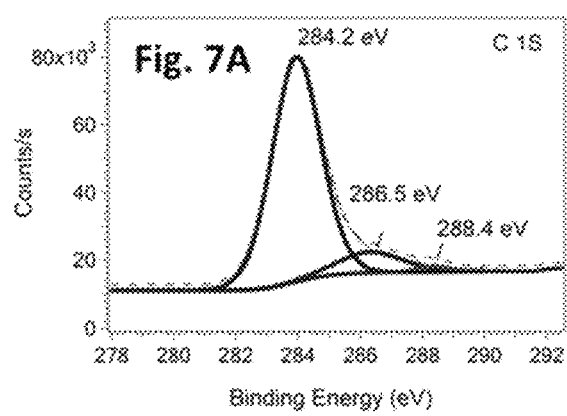
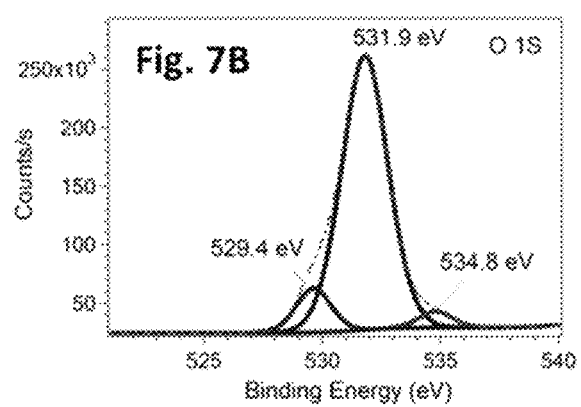
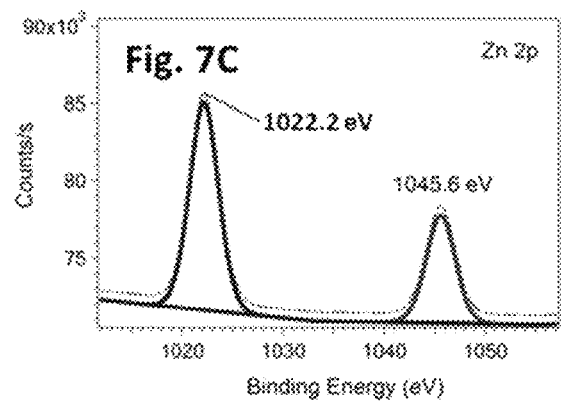
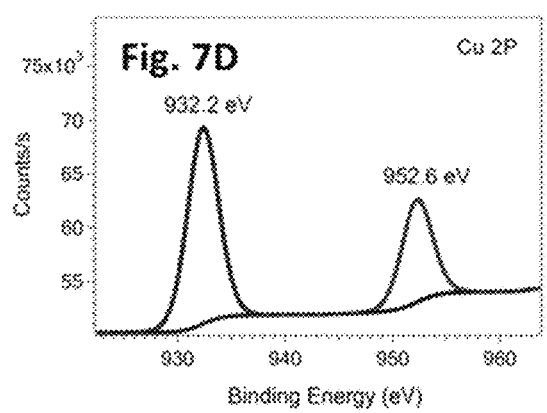

ELECTRODE AND AN ELECTROCHEMICAL CELL FOR PRODUCING PROPANOL FROM CARBON DIOXIDE

STATEMENT OF FUNDING ACKNOWLEDGEMENT

The funding support provided by the Center of Excellence in Nanotechnology (CENT) at the Chemistry Department of the King Fahd University of Petroleum and Minerals is gratefully acknowledged.

STATEMENT REGARDING PRIOR DISCLOSURES BY THE INVENTOR OR A JOINT INVENTOR

R. A. Geioushy et al. *Graphene/ZnO/Cu$_2$O electrocatalyst for selective conversion of CO$_2$ into n-propanol*, Electrochimica Acta, Volume 245, Aug. 10, 2017, Pages 456-462, which is incorporated by reference in its entirety.

BACKGROUND OF THE INVENTION

Technical Field

The present invention relates to an electrode with a conductive substrate and an electrocatalyst comprising zinc oxide and copper oxide supported on a carbon nanomaterial.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Carbon dioxide is a common feedstock for manufacturing commodity chemicals and fuels, however it is also a major source of global warming [L. M. Aeshala, R. G. uppaluri, A. Verma, J. CO$_2$ Util. 3-4 (2013) 49-55; Q. Guo, Q. Zhang, H. Wang, Z. Liu, Z. Zhao, Catal. Commun. 77 (2016) 118-122]. The increasing demand for energy requires burning fossil fuels such as coal, oil, and natural gas, which further leads to an increase in CO$_2$ emission into the atmosphere [M. F. Baruch, J. E. Pander III, J. L. White, A. B. Bocarsly, ACS Catal. 2015, 5, 3148-3156]. One approach for reducing CO$_2$ emissions is to convert the carbon dioxide to valuable organic molecules and hydrocarbons, e.g. alcohols [D. Kim, K. K. Sakimoo, D. Hong, P. Yang, Angew. Chem. Int. Ed., 2015, 54, 3259-3266; R. Zhang, W. Lv, G. Li, L. Lei, Mater. Lett., 2015, 63-66]. One way of converting CO$_2$ to valuable products can be achieved through electroreduction of CO$_2$, which is a simple and a selectively controlled process. The electrochemical reduction of CO$_2$ to C$_1$-C$_2$ products has been extensively studied with various types of electrodes [G. Keerthiga, B. Viswanathan, R. Chetty, Catal. Today, 245 (2015) 68-73; J. Rosen, G. S. Hutchings, Q. Lu, R. V. Forest, A. Moore, F. Jiao, ACS Catal., 2015, 5 (8), 4586-4591; D. DeCiccio, Ahn, S. Sen, F. Schunk, G. T. R. Palmore, C. Rose-Petruck, Electrochem. Commun., 52 (2015) 13-16; Q. Lu, Feng Jiao, Nano Energy, 29 (2016) 439-456; Y. Hori, H. Konishi, T. Futamura, A. Murata, O. Koga, H. Sakurai, K. Oguma, Electrochim. Acta, 50 (2005) 5354-5369; J. F. Xie, Y. X. Huang, W. W. Li, X. N. Song, L. Xiong, H. Q. Yu, Electrochim. Acta 139 (2014) 137-144]. However, electrocatalysts capable of converting CO$_2$ to higher value-added products, such as C$_2$ or C$_3$ alcohols, are still needed. The conversion of CO$_2$ to n-propanol is attractive due to the relatively high energy-mass density of n-propanol (30.94 KJ/g), thus making n-propanol an alternative liquid fuel for gasoline [D. Ren, N. T. Wong, A. D. Handoko, Y. Huang, B. S. Yeo, J. Phys. Chem. Lett., 2016, 7, 20-24]. In recent years, copper electrodes have been used as active cathodes for converting CO$_2$ into n-propanol. However such conversion reactions generally suffer from low efficiency and low product yield [D. Ren, N. T. Wong, A. D. Handoko, Y. Huang, B. S. Yeo, J. Phys. Chem. Lett, 2016, 7, 20-24; K. P. Kuhl, E. R. Cave, D. N. Abram, T. F. Jaramillo, Energy Environ. Sci., 2012, 5, 7050-7059; Y. Hori, I. Takahashi, O. Koga, N. Hoshi, J. Mol. Catal. A: Chem., 2003, 199, 39-47]. Electrodes having a stepped Cu (100) surface provide high activity towards reduction of CO$_2$ to n-propanol with a Faradaic Efficiency (FE) of about 4.6% [Y. Hori, L Takahashi, O. Koga, N. Hoshi, J. Mol. Catal. A: Chem., 2003, 199, 39-47]. Further improvement in FE was obtained by roughening the copper electrode surfaces with Cu nanoparticles, which resulted in a FE of 10% [C. W. Li, J. Ciston, M. W. Kanan, Nature, 2014, 508, 504-507]. These results indicate that the stabilization of C$_1$ and C$_2$ intermediates species over the catalyst surface is the key step to the C—C coupling and formation of C$_{2+}$ carbon hydrocarbons and alcohols.

In view of the forgoing, one objective of the present disclosure is to provide an electrode that includes a conductive substrate and an electrocatalyst disposed thereon, wherein the electrocatalyst comprises zinc oxide and copper oxide supported on a carbon nanomaterial, e.g. graphene, and an electrochemical cell that utilizes the electrode as a working electrode. Another objective of the present disclosure relates to a process for producing propanol from CO$_2$ with the electrochemical cell.

BRIEF SUMMARY OF THE INVENTION

According to a first aspect, the present disclosure relates to an electrode, including i) a conductive substrate, ii) an electrocatalyst disposed on the conductive substrate, wherein the electrocatalyst comprises zinc oxide and copper oxide supported on a carbon nanomaterial.

In one embodiment, the copper oxide is copper (I) oxide.

In one embodiment, the carbon nanomaterial is at least one selected from the group consisting of graphene, graphene oxide, reduced graphene oxide, carbon nanotube, fullerene, nanodiamond, and nanohorn.

In one embodiment, the carbon nanomaterial is graphene.

In one embodiment, the carbon nanomaterial is reduced graphene oxide.

In one embodiment, the conductive substrate is a copper substrate.

In one embodiment, the zinc oxide has a dendrite structure and the copper oxide is deposited on the dendrite structure.

In one embodiment, the carbon nanomaterial is graphene, wherein the dendrite structure is deposited on the graphene.

In one embodiment, a weight ratio of the zinc oxide to the copper (I) oxide is in the range of 5:1 to 1:5.

According to a second aspect, the present disclosure relates to a method of fabricating the electrode, involving i) mixing the carbon nanomaterial with water and sonicating to form a suspension, ii) mixing the suspension with a zinc-containing solution, a copper-containing solution, a surfactant, an alkali hydroxide solution, and a hydroxylammonium halide solution and stirring to form the electrocatalyst in the suspension, iii) separating the electrocatalyst from the suspension, iv) mixing the electrocatalyst with a nafion solution and an organic solvent and sonicating to form a coating precursor, v) coating at least a portion of the coating precursor on the conductive substrate thereby fabricating the electrode.

In one embodiment, a molar ratio of zinc in the zinc-containing solution to the copper in the copper-containing solution is in the range of 5:1 to 1:5.

In one embodiment, the zinc-containing solution is an aqueous zinc chloride solution with a concentration of 0.01 to 1.5 M, and the copper-containing solution is an aqueous copper (II) chloride solution with a concentration of 0.01 to 1.5 M.

In one embodiment, the surfactant is sodium dodecyl sulfate, the alkali hydroxide solution is an aqueous sodium hydroxide solution with a concentration of 0.1 to 5.0 M, and the hydroxylammonium halide is an aqueous hydroxylammonium chloride solution with a concentration of 0.01 to 1.5 M.

According to a third aspect, the present disclosure relates to an electrochemical cell, including i) the electrode, ii) a reference electrode, iii) a counter electrode, wherein the reference electrode and the counter electrode are in ionic communication with the electrode via an electrolyte.

In one embodiment, the electrolyte comprises an aqueous sodium bicarbonate solution with a concentration of 0.1 to 5.0 M.

In one embodiment, the reference electrode comprises silver-silver chloride, and the counter electrode comprises platinum.

According to a fourth aspect, the present disclosure relates to a process for producing propanol from $CO_2$ with the electrochemical cell, involving i) mixing a $CO_2$ stream with the electrolyte, ii) applying a voltage to the electrode and the counter electrode relative to the reference electrode to reduce at least a portion of $CO_2$ present in the electrolyte thereby producing propanol in the electrolyte.

In one embodiment, the process further involves separating the propanol from the electrolyte.

In one embodiment, the process is performed at a temperature of 15 to 35° C., and the voltage is in the range of 0.5 to 2.0 volts, wherein a Faradaic efficiency of producing propanol from $CO_2$ is in the range of 10% to 40%.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is a SEM micrograph of zinc oxide.

FIG. 4B is a SEM micrograph of an electrocatalyst including zinc oxide and graphene.

FIG. 4C is a SEM micrograph of an electrocatalyst including zinc oxide, copper (I) oxide, and graphene, wherein a weight ratio of the zinc oxide to the copper (I) oxide is 2:1.

FIG. 4D is a SEM micrograph of an electrocatalyst including zinc oxide, copper (I) oxide, and graphene, wherein a weight ratio of the zinc oxide to the copper (I) oxide is 1:2.

FIG. 7A represents a C is scan of an XPS spectrum and corresponding deconvoluted peaks of an electrocatalyst including zinc oxide, copper (I) oxide, and graphene, wherein a weight ratio of the zinc oxide to the copper (I) oxide is 1:2.

FIG. 7B represents an O 1s scan of an XPS spectrum and corresponding deconvoluted peaks of an electrocatalyst including zinc oxide, copper (I) oxide, and graphene, wherein a weight ratio of the zinc oxide to the copper (I) oxide is 1:2.

FIG. 7C represents a Zn 2p scan of an XPS spectrum and corresponding deconvoluted peaks of an electrocatalyst including zinc oxide, copper (I) oxide, and graphene, wherein a weight ratio of the zinc oxide to the copper (I) oxide is 1:2.

FIG. 7D represents a Cu 2p scan of an XPS spectrum and corresponding deconvoluted peaks of an electrocatalyst including zinc oxide, copper (I) oxide, and graphene, wherein a weight ratio of the zinc oxide to the copper (I) oxide is 1:2.

DETAILED DESCRIPTION OF THE EMBODIMENTS

Figure 1A:
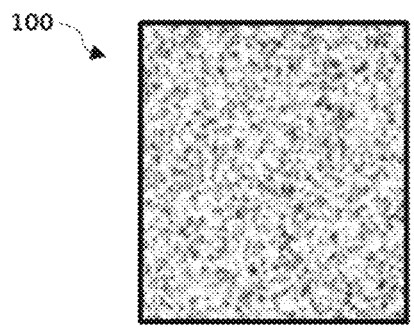
FIG. 1A illustrates a top-view of an electrode that includes a conductive substrate and an electrocatalyst disposed thereon, wherein the electrocatalyst covers an entire surface of the conductive substrate.

Referring now to the drawings, wherein like reference numerals designate identical or corresponding parts throughout the several views.

Referring to FIGS. 1A-1D, according to a first aspect, the present disclosure relates to an electrode 100 that includes a conductive substrate 104 and an electrocatalyst 102 disposed on the conductive substrate 104.

Preferably, the term "electrode" in this disclosure refers to a working electrode of an electrochemical cell, and therefore, the term "electrode" and the term "working electrode" may be used interchangeably throughout the present disclosure. For example, in some embodiments, the term "electrode" refers to a component of a circuit, e.g. an electrochemical cell that can be brought into contact with a non-metallic element of the electrochemical cell, e.g. an electrolyte.

The term "electrocatalyst" as used in this disclosure refers to an active component of the electrode that may be used in an electrocatalytic reaction, e.g. reduction of carbon dioxide, etc. The electrocatalyst 102 contains zinc oxide and copper oxide supported on a carbon nanomaterial. In some preferred embodiments, the electrocatalyst 102 may have a thickness of less than 20 μm, preferably less than 15 μm, preferably less than 10 μm. Alternatively, the electrocatalyst 102 may have a thickness in the range of 20 to 500 μm, preferably 40 to 200 μm, preferably 60 to 100 μm.

The copper oxide may include copper (I) oxide and/or copper (II) oxide. In a preferred embodiment, at least 99 wt %, preferably at least 99.5 wt %, preferably at least 99.9 wt % of the copper oxide contains copper (I) oxide. In some alternative embodiments, the copper oxide contains copper (I) oxide and copper (II) oxide, wherein a weight ratio of copper (I) oxide to copper (II) oxide is in the range of 1,000:1 to 2:1, preferably 500:1 to 5:1, preferably 200:1 to 10:1, preferably 100:1 to 20:1.

In another preferred embodiment, a weight ratio of the zinc oxide to the copper (I) oxide is in the range of 5:1 to 1:5, preferably 4:1 to 1:4, preferably 3:1 to 1:3, preferably 2:1 to 1:2.

The carbon nanomaterial may be at least one selected from the group consisting of graphene, graphene oxide, reduced graphene oxide, carbon nanotube, fullerene, nanodiamond, and nanohorn. In a preferred embodiment, the carbon nanomaterial is graphene. In another preferred embodiment, the carbon nanomaterial is reduced graphene oxide. Yet in another preferred embodiment, the carbon nanomaterial contains graphene and reduced graphene oxide, wherein a weight ratio of graphene to the reduced graphene oxide is in the range of 100:1 to 1:100, preferably 90:1 to 1:90, preferably 80:1 to 1:80.

Figure 3:
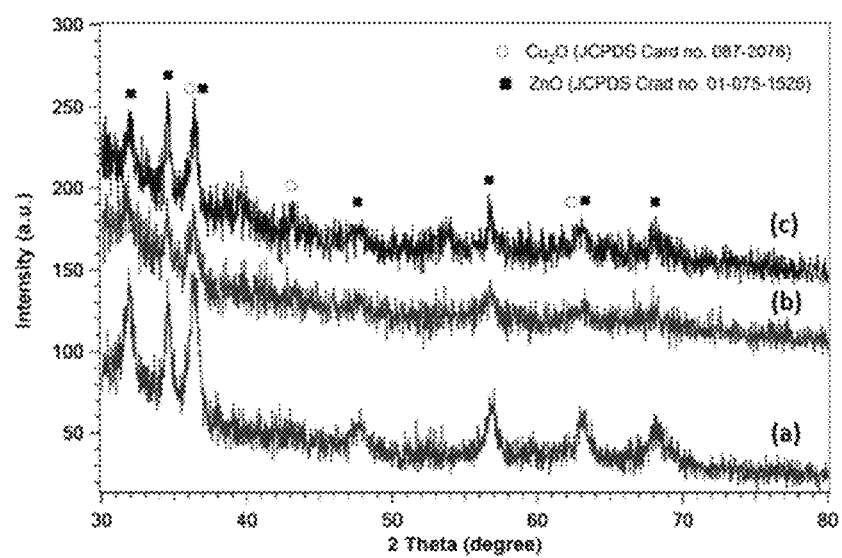
FIG. 3 represents an XRD spectrum of an electrocatalyst including (a) zinc oxide and graphene; (b) zinc oxide, copper (I) oxide, and graphene, wherein a weight ratio of the zinc oxide to the copper (I) oxide is 2:1; (c) zinc oxide, copper (I) oxide, and graphene, wherein a weight ratio of the zinc oxide to the copper (I) oxide is 1:2.

As shown in the SEM micrographs of FIG. 4B, in the absence of the copper oxide in the electrocatalyst, the zinc oxide has a flower-like morphology with an average particle size of 50 to 1,000 nm, preferably 100 to 800 nm, preferably 200 to 600 nm, more preferably about 500 nm, wherein the zinc oxide is deposited on the carbon nanomaterial. In the embodiments where the carbon nanomaterial is graphene, the zinc oxide with the flower-like morphology may be deposited on one side or preferably both sides of the graphene, as shown in FIG. 4B. The zinc oxide may have a hexagonal wurtzite crystal structure, as shown in the XRD spectrum of FIG. 3(a). The flower-like morphology may be formed due to a growth of zinc oxide hexagonal wurtzite crystal structures in the absence of copper oxide, etc.

As shown in the SEM micrographs of FIGS. 4C and 4D, when the copper oxide is present in the electrocatalyst, the zinc oxide has a dendrite structure with the copper oxide deposited thereon, wherein the dendrite structure is deposited on the carbon nanomaterial, for example, on one side or preferably both sides of the graphene or reduced-graphene oxide. The dendrite structure may be formed due to the growth of zinc oxide hexagonal wurtzite crystal structures in the presence of impurities such as copper oxide (or copper (I) oxide). The copper oxide (or copper (I) oxide) may be present in pores of the dendrite structure, or in direct contact with the carbon nanomaterial. The size of the dendrite structure may vary in the range from about 50 nm to about 10 μm, preferably from about 100 nm to about 5 μm, preferably from about 150 nm to about 2 μm, preferably from about 200 nm to about 500 nm. The presence of copper oxide (or copper (I) oxide) may affect the morphology of the electrocatalyst, as evident from the XRD spectrum of FIG. 3(b) and FIG. 3(c).

In some embodiments, the electrocatalyst 102 may further contain copper nanoparticles (i.e., metallic copper(0)) with an average particle size of less than 100 nm, preferably 10 to 80 nm, preferably 15 to 50 nm, more preferably 20 to 40 nm. Preferably, the copper nanoparticles are deposited on the dendrite structure. The presence of the copper nanoparticles in the electrocatalyst may enhance a catalytic activity of the electrocatalyst by roughening a surface of the electrocatalyst.

The electrocatalyst 102 may contain pores with an average pore size in the range of 1 to 50 nm, preferably 2 to 40 nm, preferably 3 to 30 nm, preferably 4 to 25 nm; a specific pore volume in the range from about 0.01 to about 1.0 $cm^3/g$, preferably from about 0.03 to about 0.9 $cm^3/g$, preferably from about 0.05 to about 0.8 $cm^3/g$; and a BET surface area in the range from about 10 to about 300 $m^2/g$, preferably from about 20 to about 200 $m^2/g$, preferably from about 30 to about 100 $m^2/g$, preferably from about 40 to about 80 $m^2/g$.

In terms of the present disclosure, the conductive substrate 104 is an electrically conductive material that supports the electrocatalyst 102, and electrically connects the electrocatalyst 102 to a voltage source, e.g. a potentiostat 208. The conductive substrate 104 may have a rounded shape, e.g. circular or elliptical; or a rectangular shape, as shown in FIG. 1A-1D with an aspect ratio (width to length ratio) in the range of 1:1 to 1:50, or 1:2 to 1:30, or 1:3 to 1:20, or 1:4 to 1:10. The conductive substrate 104 may have a thickness in the range of no more than 3 mm, preferably no more than 2 mm, preferably no more than 1 mm, preferably no more than 0.8 mm, preferably no more than 0.5 mm, preferably no more than 0.4 mm. In some alternative embodiments, the conductive substrate 104 may have a thickness in the range of 3 to 50 mm, preferably 4 to 20 mm, preferably 5 to 15 mm. Preferably a ratio of the thickness of the electrocatalyst 102 to the thickness of the conductive substrate 104 is in the range of 1:2 to 1:100, preferably 1:3 to 1:50, preferably 1:4 to 1:20.

In a preferred embodiment, the conductive substrate 104 is a copper substrate or a copper alloy substrate. In some alternative embodiments, the conductive substrate 104 comprises at least one element selected from the group consisting of gold, titanium, platinum, silver, palladium, ruthenium, rhenium, iron, nickel, indium, lead, tin, and zinc. An electrical conductivity of the conductive substrate 104 may be within the range of $10^3$ to $3.0 \times 10^3$ s/m, preferably $1.2 \times 10^3$ to $2.5 \times 10^3$ s/m, preferably $1.5 \times 10^3$ to $2.0 \times 10^3$ s/m, at a temperature in the range of 20 to 30° C., preferably 22 to 28° C., preferably about 25° C.

The electrocatalyst 102 may be electrically connected to the conductive substrate 104 with methods known to those with ordinary skilled in the art. For example, in some embodiments, the electrocatalyst 102 may be adhered to the conductive substrate 104 preferably from one side and preferably with a conductive adhesive. Exemplary conductive adhesive may include, without limitation, an alkyl acetate, a polyether acetate, a conductive epoxy, nafion, polythiophene, poly(thiophene-co-styrenesulfonate), polyaniline, polyacetylene, polypyrrole, and derivatives or combinations thereof. Preferably, the conductive adhesive may have a thickness of no more than 500 μm, preferably no more than 200 preferably in the range of 50 to 100 μm.

Figure 1B:
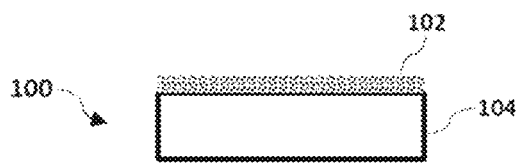
FIG. 1B illustrates a side-view of the electrode, wherein the electrocatalyst covers an entire surface of the conductive substrate.
Figure 1C:
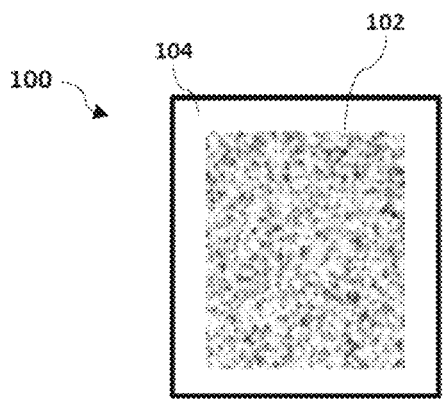
FIG. 1C illustrates a top-view of an electrode that includes a conductive substrate and an electrocatalyst disposed thereon, wherein the electrocatalyst covers a portion of a surface of the conductive substrate.
Figure 1D:
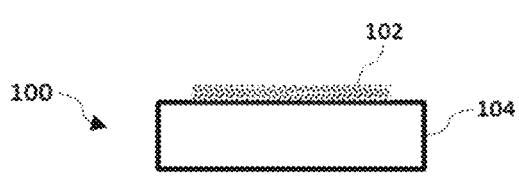
FIG. 1D illustrates a side-view of the electrode, wherein the electrocatalyst covers a portion of the surface of the conductive substrate.

The electrocatalyst 102 may completely cover a surface of the conductive substrate 104, as shown in FIGS. 1A and 1B, or it may partially cover the surface of the conductive substrate 104, as shown in FIGS. 1C and 1D. In one embodiment, the electrocatalyst 102 may cover at least 10%, preferably at least 20%, preferably at least 30%, preferably at least 40%, preferably at least 50%, preferably at least 60%, preferably at least 70%, preferably at least 80%, preferably at least 90%, preferably at least 95%, preferably at least 99% of the surface of the conductive substrate 104.

Other than applications in electrochemical cells, the electrode 100 may be utilized in various applications such as fuel cells, photovoltaic cells, and solar cells. In some embodiment, the electrode may be utilized in drug-delivery applications, e.g. as a drug carrier, or in adsorbing columns or adsorbing refrigerators as an adsorbing material.

According to a second aspect, the present disclosure relates to a method of fabricating the electrode 100. Accordingly, in a first step, the method involves mixing the carbon nanomaterial with water and sonicating to form a suspension.

The carbon nanomaterial may preferably be graphene oxide, which may be synthesized with methods known to those skilled in the art, e.g. the Hummers' method. The suspension may preferably be prepared as described in the work of Ismail et al. [A. A. Ismail, R. A. Geioushy, H. Bouzid, S. A. Al-Sayari, A. Al-Hajry, D. W. Bahnemann, Appl. Catal. B: Environ., 129 (2013) 62-70]. In some embodiments, a mass concentration of graphene oxide in the suspension is in the range from about 0.1 mg/100 ml to about 10 mg/100 ml, preferably from about 0.5 mg/100 ml to about 5 mg/100 ml, preferably from about 1.0 mg/100 ml to about 4 mg/100 ml, preferably from about 1.5 mg/100 ml to about 2 mg/100 ml. The duration of the sonicating may vary depending on the type of the carbon nanomaterial. For example, in a preferred embodiment, the carbon nanomaterial is graphene oxide, which is sonicated in water for 10 to 60 minutes, preferably 20 to 40 minutes, preferably about 30 minutes. The carbon nanomaterial may preferably be mixed with water and sonicated at room temperature (i.e. a temperature in the range of 15 to 35° C., preferably 20 to 30° C., preferably 22 to 28° C.), atmospheric pressure (i.e. a pressure in the range of 0.9 to 1.1 atm, preferably about 1 atm), and in the presence of an inert gas (e.g. nitrogen, helium, argon, etc.). The water may preferably be deionized water. Alternatively, various carbon nanomaterials may be utilized in lieu of the graphene oxide. Exemplary carbon nanomaterials may include, but are not limited to carbon nanotube, fullerene, nanodiamond, nanohorn, etc.

In a second step, the suspension is mixed with a zinc-containing solution, a copper-containing solution, a surfactant, an alkali hydroxide solution, and a hydroxylammonium halide solution, followed by stirring to form the electrocatalyst in the suspension.

In a preferred embodiment, the zinc-containing solution is first mixed with the copper-containing solution and the surfactant, and then stirred for 1 to 4 hours, preferably 2 to 3 hours, at a temperature in the range of 25 to 40° C., preferably 30 to 38° C., preferably 32 to 36° C.; and then the alkali hydroxide solution and the hydroxylammonium halide solution are added there to and stirred for 10 to 60 minutes, preferably 20 to 40 minutes, preferably about 30 minutes. The zinc-containing solution may preferably be an aqueous zinc chloride solution with a concentration of 0.01 to 1.5 M, preferably 0.05 to 1.0 M, preferably 0.08 to 0.15 M. Alternative zinc-containing solutions such as an aqueous zinc sulfate solution, an aqueous zinc acetate solution, or an aqueous zinc nitrate solution may also be utilized. The copper-containing solution may preferably be an aqueous copper (II) chloride solution with a concentration of 0.01 to 1.5 M, preferably 0.05 to 1.0 M, preferably 0.08 to 0.15 M. Alternative copper-containing solutions such as an aqueous copper sulfate solution, an aqueous copper acetate solution, or an aqueous copper nitrate solution may also be utilized. In one embodiment, a molar ratio of zinc in the zinc-containing solution to the copper in the copper-containing solution is in the range of 5:1 to 1:5, preferably 4:1 to 1:4, preferably 3:1 to 1:3, preferably 2:1 to 1:2.

In addition, the surfactant may preferably be sodium dodecyl sulfate (SDS), although in some embodiments, one or more surfactants such as ammonium lauryl sulfate, potassium dodecyl sulfate, sodium dodecyl sulfate, sodium laureth sulfate, sodium pareth sulfate, and sodium myreth sulfate may be used.

In a preferred embodiment, the suspension is mixed with the aqueous zinc chloride solution, the aqueous copper (II) chloride solution, and sodium dodecyl sulfate (SDS) such that a weight ratio of SDS to graphene oxide in the suspension is in the range of 100:1 to 50:1, preferably 90:1 to 60:, preferably about 85:1.

The alkali hydroxide solution may preferably be an aqueous sodium hydroxide solution with a concentration of 0.1 to 5.0 M, preferably 0.5 to 2.0 M, preferably 0.8 to 1.2 M. Alternative alkali hydroxide solutions that are known to those skilled in the art, e.g. an aqueous lithium hydroxide solution or an aqueous potassium hydroxide solution may also be used.

The hydroxylammonium halide may preferably be an aqueous hydroxylammonium chloride solution with a concentration of 0.01 to 1.5 M, preferably 0.05 to 1.0 M, preferably 0.08 to 0.15 M. Alternative hydroxylammonium halides that are known to those skilled in the art, e.g. an aqueous hydroxylammonium fluoride solution, an aqueous hydroxylammonium bromide solution, or an aqueous hydroxylammonium iodide solution may also be used. In some embodiments, an aqueous hydroxylammonium sulfate solution or an aqueous hydroxylammonium nitrate solution may be used in lieu of the aqueous hydroxylammonium chloride solution.

Once all ingredients, i.e. the suspension, the zinc-containing solution, the copper-containing solution, the surfactant, the alkali hydroxide solution, and the hydroxylammonium halide solution are mixed, said ingredients are preferably stirred for at least 30 minutes, preferably at least 1 hour, but no more than 3 hours, at a temperature in the range of 25 to 40° C., preferably 30 to 35° C., during which the electrocatalyst is formed in the suspension.

In a third step, the electrocatalyst is separated from the suspension. Accordingly, the suspension may be centrifuged, and then washed by an organic solvent, e.g. ethanol, acetone, toluene, etc., followed by washing with deionized water. The electrocatalyst may preferably be dried at a temperature of 30 to 70° C., preferably 35 to 50° C., preferably about 40, for 12 to 24 hours, preferably about 18 hours, to collect the electrocatalyst preferably in a powder form.

Figure 6A:
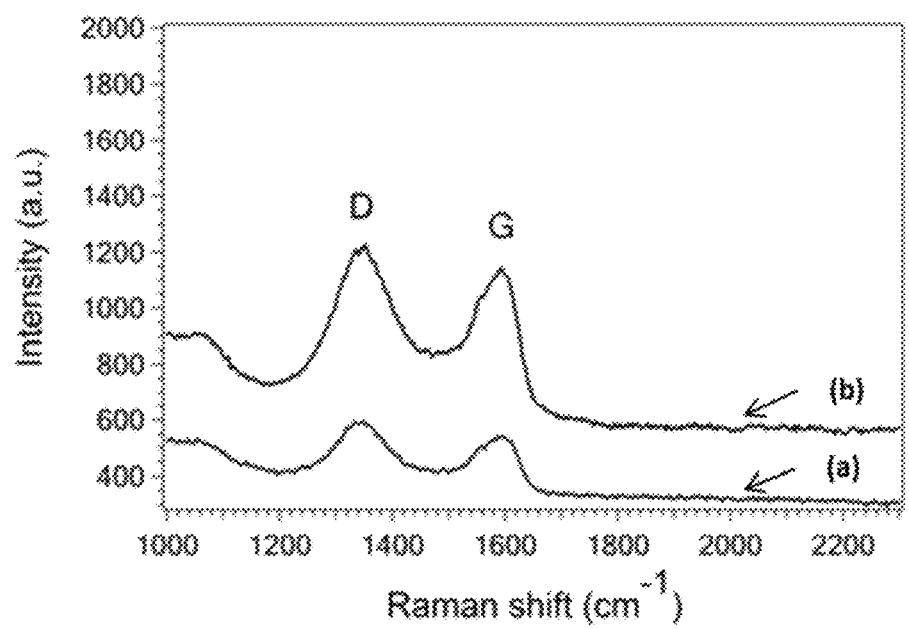
FIG. 6A represents Raman spectra of an electrocatalyst including (a) zinc oxide, copper (I) oxide, and graphene, wherein a weight ratio of the zinc oxide to the copper (I) oxide is 2:1; (b) zinc oxide, copper (I) oxide, and graphene, wherein a weight ratio of the zinc oxide to the copper (I) oxide is 1:2.
Figure 6B:
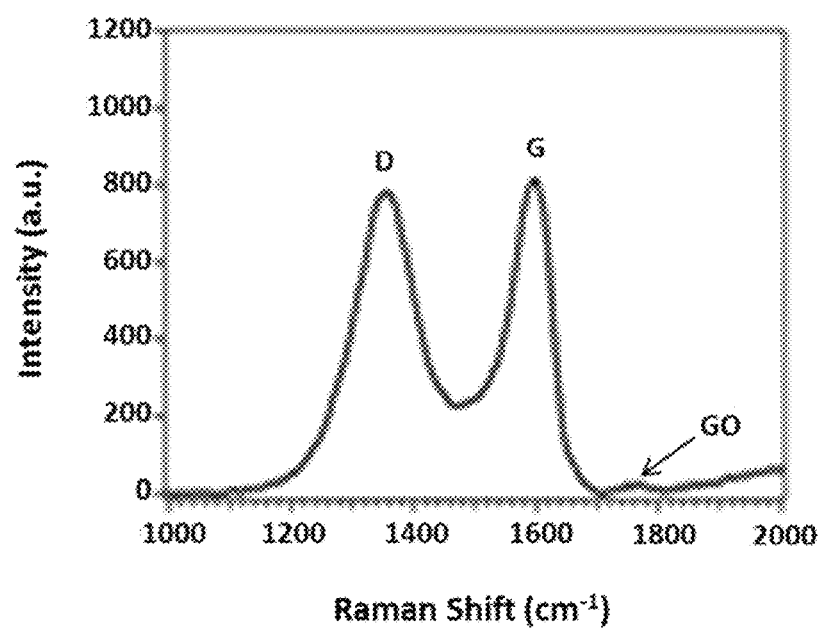
FIG. 6B represents a Raman spectrum of graphene oxide (GO).

In some embodiments, the carbon nanomaterial is graphene oxide that has been partially reduced and thus the electrocatalyst contains a mixture of graphene oxide and reduced-graphene oxide. In some preferred embodiments, the carbon nanomaterial is graphene oxide that has been completely reduced and thus the electrocatalyst contains reduced graphene oxide, which differs from graphene in that it contains structural defects, but like graphene, does not include oxide groups. The presence of reduced-graphene oxide or preferably graphene during formation of the electrocatalyst may be determined by Raman spectra, as shown in FIGS. 6A and 6B.

In a fourth step, the electrocatalyst is mixed with a nafion solution and an organic solvent, followed by a sonication step (or preferably an ultra-sonication step) for 5 to 30 minutes, preferably 10 to 20 minutes to form a coating precursor. Preferably, a mass concentration of the electrocatalyst in the coating precursor is in the range of 1 to 20 wt %, preferably 2 to 15 wt %, preferably 3 to 10 wt %, preferably about 5 wt %, relative to the total weight of the coating precursor.

Once the coating precursor is prepared, the conductive substrate may be coated by drop-casting at least a portion of the coating precursor on the conductive substrate, followed by a drying step to form the electrode 100. The coating precursor may alternatively be coated on the conductive substrate with methods known to those skilled in the art, e.g. spin-coating, spray-coating, dipping, brushing, etc. The conductive substrate may be acid treated before coating with the coating precursor. Treating the conductive substrate with an acid, e.g., sulfuric acid and/or nitric acid may form carboxylic acid functional groups in the conductive substrate that may stabilize the carbon nanomaterial, the zinc oxide, and/or the copper oxide on the conductive substrate, due to the presence of strong interactions between these components and carbon atoms that are present in the carboxylate groups. Alternatively, the conductive substrate may be plasma treated with a plasma gas under a reduced pressure of 0.5 atm to vacuum, or 0.3 atm to 0.1 atm. As used herein, plasma refers to a matter that exists in the form of ions and electrons, which is formed by electrically charging a gas. As used herein, plasma treatment refers to a way of functionalizing a surface of a material by interacting ions and electrons with the surface. The plasma gas may be oxygen, argon, and/or nitrogen, and the conductive substrate may be plasma treated for 1 to 5 minutes, or 2 to 4 minutes under the reduced pressure. The conductive substrate may be washed with an organic solvent, e.g. acetone, ethanol, toluene, hydrochloric acid, hydrofluoric acid, etc. and water before and/or after plasma treatment. For example, in some embodiments, the conductive substrate may be first plasma treated and then washed with water and/or an alcohol, e.g. methanol, ethanol, and/or isopropanol to form hydroxylate groups on the conductive substrate.

In some preferred embodiments, the coating precursor is dried with an incandescent lamp. For example, the coating precursor may be exposed to the incandescent lamp for at least 18 hours, preferably 18 to 24 hours. Alternative methods as known to those in the art may also be utilized to dry the coating precursor on the conductive substrate.

Once the electrode is fabricated, in some embodiments, the electrocatalyst may be coated with copper nanoparticles via deposition methods known to those skilled in the art, such as, e.g., sputtering, ion bombardment, etc.

Figure 2A:
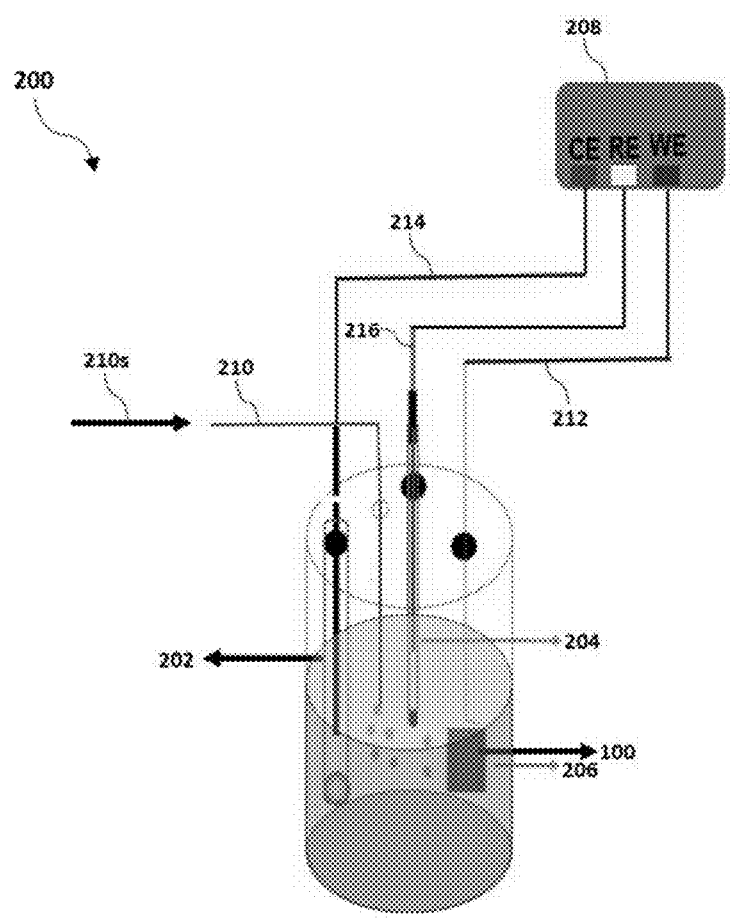
FIG. 2A illustrates an electrochemical cell, wherein the electrode (i.e. the working electrode) is completely submerged in the electrolyte.
Figure 2B:
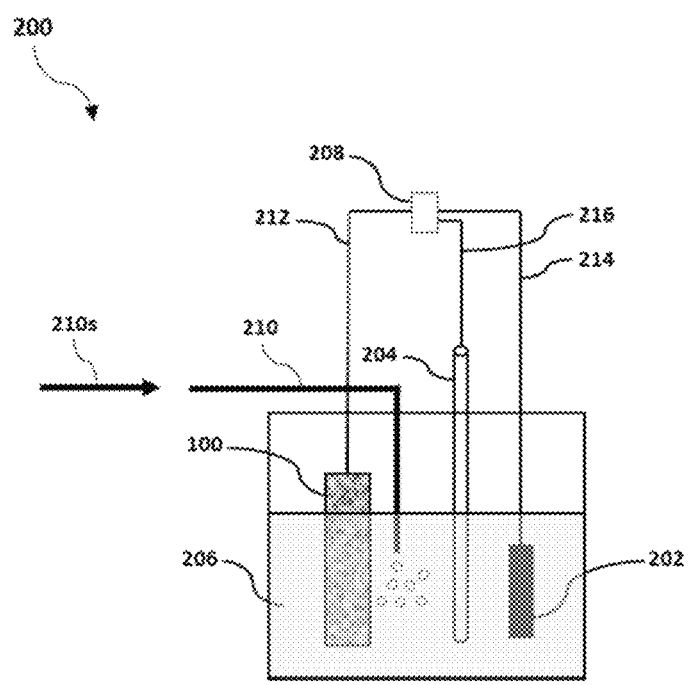
FIG. 2B illustrates an electrochemical cell, wherein the electrode (i.e. the working electrode) is partially submerged in the electrolyte.

Referring to FIGS. 2A and 2B, according to a third aspect, the present disclosure relates to an electrochemical cell 200 that includes the electrode 100, a reference electrode 204, and a counter electrode 202, wherein the reference electrode 204 and the counter electrode 202 are in ionic communication with the electrode 100 via an electrolyte 206. The electrode 100 may be connected to a potentiostat 208 via the wire 212, the counter electrode 202 may be connected to the potentiostat 208 via the wire 214, and the reference electrode 204 may be connected to the potentiostat 208 via the wire 216 as shown in FIGS. 2A and 2B.

The electrochemical cell 200 of this disclosure may preferably be utilized to reduce carbon dioxide in order to produce propanol and one or more of $C_1$ hydrocarbon compounds e.g. methanol, $C_2$ hydrocarbon compounds e.g.

ethanol, etc. The electrochemical cell 200 may also be used to reduce one or more carbon-containing compounds to detect or determine a concentration of the carbon-containing compounds in a solution or a mixture.

In one embodiment, the counter electrode 202 of the electrochemical cell 200 includes platinum. The counter electrode 202 may preferably be made of platinum. Although in some embodiments, the counter electrode 202 may be made of a platinum alloy having at least 50 wt %, preferably at least 60 wt %, preferably at least 70 wt %, preferably at least 80 wt %, preferably 85 wt % to 95 wt % of platinum relative to the total weight of the counter electrode; and less than 40 wt %, preferably less than 30 wt %, preferably less than 20 wt %, preferably 5 wt % to 15 wt % of at least one metallic element selected from the group consisting of gold, titanium, silver, palladium, ruthenium, rhenium, iron, nickel, indium, lead, tin. In some other embodiments, the counter electrode 202 is made of a platinum alloy, wherein a weight ratio of the at least one metallic element to platinum in the platinum alloy is in the range from about 1:1 to about 1:20, preferably 1:2 to about 1:15, preferably 1:3 to about 1:12, preferably 1:5 to about 1:10. An electrical conductivity of the counter electrode 202 may be within the range of $3.0 \times 10^6$ to $7.0 \times 10^7$ s/m, preferably $5.0 \times 10^6$ to $5.0 \times 10^7$ s/m, preferably $10^7$ to $2.0 \times 10^7$ s/m, at room temperature (i.e. a temperature of 20 to 30° C., preferably 22 to 28° C., preferably about 25° C.).

In terms of the present disclosure, the "reference electrode" refers to a component of the electrochemical cell that has a fixed and a reproducible electrode potential over an extended period of time and in various temperatures. In a preferred embodiment, the reference electrode 204 is a silver-silver chloride electrode. However, in one embodiment, the reference electrode 204 may be a saturated calomel electrode. In some embodiments, the electrochemical cell 200 may not include a reference electrode, and therefore the counter electrode 202 may serve as a combined counter/reference electrode.

The "electrolyte" refers to a non-metallic element of the cell that ionically connects the working electrode 100 to the counter electrode 202 and the reference electrode 204. In a preferred embodiment, the electrolyte 206 contains an aqueous sodium bicarbonate solution with a concentration of 0.1 to 5.0 M, preferably 0.2 to 4.0 M, preferably 0.3 to 3.0 M, preferably 0.4 to 2.0 M, preferably about 0.5 M. In another embodiment, the electrolyte 206 may be one or more of (without limitation) sodium chloride, sodium carbonate, potassium nitrate, calcium chloride, sodium hydroxide, potassium hydroxide, sodium acetate, and magnesium hydroxide. The electrolyte 206 may have a pH in the range of 6 to 9, preferably 7 to 8.5, preferably about 8.4. Depending on the application of the electrochemical cell, the electrolyte 206 may preferably be equilibrated at room temperature (i.e. a temperature of 20 to 30° C., preferably 22 to 28° C., preferably about 25° C.), or an elevated temperature in the range of 40 to 150° C., or 50 to 120° C., or about 60 to 100° C. For example, in one embodiment, the electrochemical cell 200 may be used for producing propanol from $CO_2$, wherein the electrolyte 206 may have a temperature in the range of 20 to 30° C., preferably 22 to 28° C., preferably about 25° C.

The working electrode 100 may be completely submerged in the electrolyte 206, as shown in FIG. 2A, or may be partially submerged in the electrolyte 206, as shown in FIG. 2B.

According to a fourth aspect, the present disclosure relates to a process for producing propanol from $CO_2$ with the electrochemical cell 200. Accordingly, in a first step, a $CO_2$ stream 210s is mixed with the electrolyte 206. The $CO_2$ stream 210s may be delivered from a coal plant as a byproduct obtained from combusting a fossil fuel, e.g., coal, oil, and/or gas. Alternatively, the $CO_2$ stream 210s may be transported from industrial production processes, such as mineral production processes, metal production processes, petrochemical processes, power plants, etc. Alternatively, the $CO_2$ stream 210s may be delivered from an upstream $CO_2$ storage tank with a compressor. Preferably, the $CO_2$ stream 210s may have a purity of at least 99 vol %, preferably at least 99.5 vol %, preferably at least 99.9 vol %.

In a preferred embodiment, the $CO_2$ stream 210s is mixed with the electrolyte in a continuous fashion for at least 10 minutes, preferably at least 30 minutes prior to applying a voltage to the working electrode 100 and the courter electrode 202. Preferably, the electrolyte 206 is continuously stirred during mixing with the $CO_2$ stream 210s.

The $CO_2$ stream 210s may be mixed with the mixture using various methods known to those skilled in the art. For example, in a preferred embodiment, the $CO_2$ stream 210s is injected (preferably continuously injected) into the electrolyte at an injection rate of 1 to 50 mL/min, preferably 2 to 30 mL/min, preferably 3 to 20 mL/min, preferably about 10 ml/min. In larger scale applications, the injection rate of the $CO_2$ stream 210s may be in the range of 50 to 10,000 mL/min, preferably 100 to 5,000 mL/min, preferably 150 to 1,000 mL/min. The $CO_2$ stream 210s may be injected at a pressure of at least 10 psi, preferably at least 20 psi, preferably at least 30 psi. In a preferred embodiment, the $CO_2$ stream 210s is injected at a pressure in the range of 10 to 80 psi, preferably 20 to 70 psi, preferably 30 to 60 psi, preferably 40 to 50 psi. The $CO_2$ stream 210s may be injected into the electrolyte 206 by various methods known to those skilled in the art. For example, in one embodiment, the $CO_2$ stream 210s is injected into the electrolyte with an injection tube 210, as shown in FIGS. 2A and 2B. In another embodiment, the $CO_2$ stream 210s may be injected into the electrolyte with a perforated tube that is immersed in the electrolyte, not shown in FIGS. 2A and 2B. The $CO_2$ stream 210s may alternatively be injected into the electrolyte using a nozzle; a sprinkler, a gas spray, or other means known to those skilled in the art.

Figure 9:
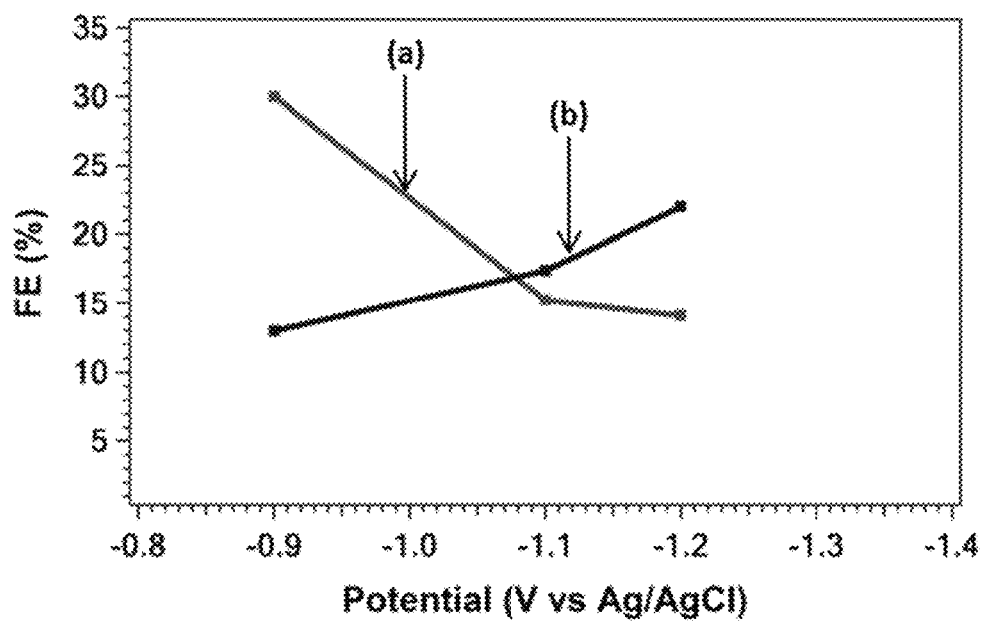
FIG. 9 represents a Faradaic efficiency of the electrochemical cell towards producing n-propanol vs. an applying voltage, wherein the electrochemical cell comprises a working electrode with an electrocatalyst including (a) zinc oxide, copper (I) oxide, and graphene, wherein a weight ratio of the zinc oxide to the copper (I) oxide is 2:1; (b) zinc oxide, copper (I) oxide, and graphene, wherein a weight ratio of the zinc oxide to the copper (I) oxide is 1:2.

After mixing the electrolyte with the $CO_2$ stream 210s, a voltage is applied to the electrode 100 and the counter electrode 202. The voltage is preferably a DC voltage with a magnitude of 0.5 to 2.0 volts, preferably 0.6 to 1.5 V, preferably 0.8 to 1.2 V. The magnitude of the voltage applied may be measured relative to the reference electrode 204. A preferred voltage magnitude may be determined based on a composition of the electrocatalyst in order to maximize a Faradaic efficiency of the electrochemical cell 200. For example, in one embodiment a weight ratio of the zinc oxide to the copper (I) oxide is in the range 2.5:1 to 1.5:1, preferably 2.25:1 to 1.75:1, preferably about 2:1, and the magnitude of the voltage is in the range of 0.7 to 1.1 volts (V), preferably 0.8 to 1.0 V, preferably about 0.9 V; wherein the electrochemical cell has a Faradaic efficiency in the range of 25% to 40%, preferably 28% to 35%, preferably about 30%, as shown in FIG. 9.

When a voltage is applied to the electrode 100 and the counter electrode 202, at least a portion of $CO_2$ present in the electrolyte may be reduced and $C_1$ and/or $C_2$ intermediate species may be formed. Said $C_1$ and/or $C_2$ intermediate species may further participate in a C—C coupling to form propanol in the electrolyte. The copper oxide (preferably copper (I) oxide) present in the electrocatalyst is an active component of the electrocatalyst that adsorbs $C_1$ intermediate species (e.g. in a form of $CO^-$), whereas the zinc oxide present in the electrocatalyst stabilizes copper atoms and strengthens $Cu-CO^-$ bond. The zinc oxide may also contribute to the reduction of $CO_2$. In addition, the graphene (or reduced graphene oxide) present in the electrocatalyst may serve as a non-metallic conductive component of the electrocatalyst for dimerization of $C_1$ to form $C_2$ intermediate species, which may further lead to a formation of $C_3$ hydrocarbon compounds, e.g. propanol.

Reducing $CO_2$ with the electrochemical cell may form $C_1$ hydrocarbon compounds in the electrolyte besides propanol. Exemplary $C_1$ hydrocarbon compounds may include, without limitation, methanol, methane, formic acid, formaldehyde, and so forth. In addition, reducing $CO_2$ with the electrochemical cell may form $C_2$ hydrocarbon compounds besides propanol. Exemplary $C_2$ hydrocarbon compounds may include, without limitation, ethanol, ethane, ethylene, acetic acid, and acetaldehyde. In a preferred embodiment, a weight ratio of the $C_1$ hydrocarbon compounds, when present, and $C_2$ hydrocarbon compounds, when present, to the propanol in the electrolyte is in the range of 1:100 to 1:20, preferably 1:99 to 1:50, preferably 1:98 to 1:70. In another preferred embodiment, the process may have a propanol selectivity of at least 80% by mole, preferably at least 85% by mole, preferably at least 90% by mole, preferably at least 95% by mole. The term "propanol selectivity" as used herein refers to a ratio of the number of moles of propanol that is produced in the electrolyte relative to the total number of moles of a product, which contains propanol as well as $C_1$ and/or $C_2$ hydrocarbon compounds.

The term "propanol" as used herein may refer to 1-propanol (i.e. n-propanol) and/or 2-propanol (i.e. Isopropyl alcohol). A composition of the propanol that is produced in the electrolyte may vary depending on the composition of the electrocatalyst and a temperature of the electrolyte. A volumetric ratio of 1-propanol to 2-propanol in the electrolyte may vary in the range from about 1:100 to about 100:1, preferably from about 1:50 to about 90:1, preferably from about 1:10 to about 85:1, preferably from about 1:1 to about 80:1. In a preferred embodiment, the propanol contains at least 80% by volume, preferably at least 90% by volume, preferably at least 95% by volume, preferably at least 98% by volume of n-propanol, relative to the total volume of the propanol. In the absence of copper oxide, or preferably copper (I) oxide, in the electrocatalyst, propanol may not be formed in the electrolyte. For example, in one embodiment, copper (I) oxide is not present in the electrocatalyst, and therefore less than 5% by volume, or less than 2% by volume, or less than 1% by volume of propanol may be produced in the electrolyte after applying the voltage.

The process of producing propanol from $CO_2$ may preferably be conducted at ambient conditions, i.e. a temperature of 15 to 35° C., preferably 20 to 30. ° C., and a pressure of 0.8 to 1.2 atm, preferably 0.9 to 1.1 atm, preferably 0.95 to 1.05 atm. Since propanol may be formed at ambient conditions without using an external heating source or a compressor, the amount of energy required for producing one kilo mole of propanol may be reduced by at least 50%, preferably by at least 80%, preferably by at least 90%, when compared to conventional propanol production processes. In view of that, the cost of producing propanol is significantly reduced, for example, by at least 50%, preferably at least 80%, preferably at least 90% when compared to the cost of producing propanol in the conventional propanol production processes.

In a preferred embodiment, the electrolyte is stirred during applying the voltage in order to prevent accumulation of propanol in the vicinity of the working electrode 100. The term "in the vicinity of the working electrode" refers to a region in the electrochemical cell with a distance of at least 1 cm, preferably at least 5 cm, preferably at least 10 cm from the working electrode. Stirring the electrolyte may be in a continuous mode during applying the voltage, or in a time-interval mode. The electrolyte may be stirred with methods known to those skilled in the art, e.g. via a mechanical stirrer or a magnetic stirrer, etc. When a mechanical stirrer or a magnetic stirrer is used, a rotatory speed of said stirrer may preferably be no more than 400 rpm, preferably in the range of 5 to 350 rpm, preferably 10 to 300 rpm, preferably 20 to 200 rpm.

After applying the voltage, a volumetric ratio of the propanol to the electrolyte may vary in the range of 5:1 to 1:100, preferably 2:1 to 1:50, preferably 1:1 to 1:20. The volumetric ratio of the propanol to the electrolyte may depend on time duration of applying the voltage, as well as the magnitude of the voltage and the composition of the electrocatalyst that determine the Faradaic efficiency of the electrochemical cell.

Faradaic efficiency of an electrocatalytic conversion of $CO_2$ to propanol may depend on the composition of the electrocatalyst and magnitude of the voltage. For example, in one embodiment a weight ratio of the zinc oxide to the copper (I) oxide is in the range 2.5:1 to 1.5:1, preferably 2.25:1 to 1.75:1, preferably about 2:1, and the magnitude of the voltage is in the range of 0.7 to 1.1 volts (V), preferably 0.8 to 1.0 V, preferably about 0.9 V; wherein the electrochemical cell has a Faradaic efficiency in the range of 25% to 40%, preferably 28% to 35%, preferably about 30%. In another embodiment, a weight ratio of the zinc oxide to the copper (I) oxide is in the range 1:2.5 to 1:1.5, preferably 1:2.25 to 1:1.75, preferably about 1:2, and the magnitude of the voltage is in the range of 0.9 to 1.5 V, preferably 1.0 to 1.4 V, preferably about 1.2 V; wherein the electrochemical cell has a Faradaic efficiency in the range of 15% to 30%, preferably 20% to 25%, preferably about 22%, as shown in FIG. 9. The term "Faradaic efficiency" as used in this disclosure describes an efficiency with which charge (electrons) is transferred in a system facilitating the electrocatalytic conversion of $CO_2$ to propanol. The Faradaic efficiency of the electrocatalytic conversion of $CO_2$ to propanol may be measured by a ratio of a quantity of the propanol formed to the total number of electrons that are passed into the electrolyte during applying the voltage.

In one embodiment, the process further involves separating the propanol from the electrolyte. Preferably other products such as the $C_1$ hydrocarbon compounds and/or $C_2$ hydrocarbon compounds, when present, may also be separated from the electrolyte, and preferably from the propanol. The propanol may be separated from the electrolyte via methods known to those skilled in the art, e.g. distillation, liquid-liquid extraction, vapor-liquid extraction, cryogenic distillation, and/or any combination thereof. A volumetric concentration of propanol that is separated from the electrolyte may be at least 80% by volume, preferably at least 90% by volume, preferably at least 95% by volume, preferably at least 99% by volume, relative to the total volume. In the embodiments where the volumetric concentration of propanol is less than 80% by volume, the propanol may first be purified before using as a feedstock in various chemical and/or petrochemical processes, e.g., propanol-to-olefin processes. Additionally, the propanol may be used for manufacturing organic compounds such as propyl halides, propyl acetate, and propionic acid. Since, the propanol has a high octane number (i.e. a research octane number in the range of 105 to 120, preferably 108 to 118), and a high energy-mass density (i.e. an energy-mass density in the range of 25 KJ/g to 35 KJ/g, preferably about 31 KJ/g), the propanol may be used as a diluent or a blend for gasoline. In some embodiments, the propanol may be used as a replacement for gasoline.

In a preferred embodiment, the electrolyte that is separated from the propanol and other products such as the $C_1$ hydrocarbon compounds and/or $C_2$ hydrocarbon compounds may be recycled to the electrochemical cell 200 to be utilized in subsequent cycles of producing propanol.

The examples below are intended to further illustrate protocols for the electrode, the electrochemical cell, the method of fabricating the electrode, and the process for producing propanol from $CO_2$ with the electrochemical cell, and are not intended to limit the scope of the claims.

Example 1—Material Synthesis and Characterization Instruments

Graphene oxide (GO) was synthesized using modified Hummers method [A. A. Ismail, R. A. Geioushy, H. Bouzid, S. A. Al-Sayari, A. Al-Hajry, D. W. Bahnemann, Appl. Catal. B: Environ., 129, 2013, 62-70, incorporated herein by reference in its entirety]. The graphene (GN)/ZnO/$Cu_2O$ composites were synthesized as follow: 1 ml of 1 mg/ml GO suspension solution was added to 61 ml ultrapure water and sonicated for 30 minutes. Then, calculated amount of 0.1 M $ZnCl_2$, 0.1 M $CuCl_2$, and 0.087 g sodium dodecyl sulfate (SDS) were mixed with GO solution under vigorous stirring for another 2 h at 34° C. After that, 1.0 M NaOH and 0.1 M hydroxylammonium chloride ($NH_2OH.HCl$) were rapidly injected into the solution mixture and stirred for 30 min. The resulting product was centrifuged, washed with ethanol and water repeatedly, and dried in vacuum at 40° C. for 18 h. Two mixtures with different ZnO/$Cu_2O$ weight ratios (1:2 and 2:1) were prepared. All chemicals were obtained from BDH Chemicals Ltd., and used as received without any further treatment.

The as-synthesized composites were characterized with a field emission scanning electron microscope (FESEM, Lyra 3, Tescan), and powder X-ray diffraction (XRD, Rigaku MiniFlex). Raman spectra of the materials were measured in the range from 500 to 2000 $cm^{-1}$ and the oxidation states of elements were analyzed by X-ray photoelectron spectroscopy (XPS, Thermo Scientific ESCALAB 250 Xi). Absorption spectra of the composites were collected at room temperature with Specord 50 single beam UV-vis spectrophotometer (Analytik Jena).

Example 2—Electrode Fabrication and Electrochemical Tests

A copper foil (fisher scientific company) was first cut into 1.3 cm×1.3 cm dimensions and polished using silicon carbide grain (150 mesh), and ultrasonically treated in diluted sulfuric acid (40% v/v, Sigma Aldrich). Then followed by cleaning with acetone and dried under $N_2$ atmosphere. 1.0 mg of the catalyst material was dispersed in 1.0 ml acetone and 60 µl nafion solution (5 wt. %), then ultrasonicated for 10 min. One portion of the suspension ink (200 µl) was dropped on the copper foil and dried under hot incandescent lamp for 24 under ambient conditions.

The electrochemical measurements were performed in a two compartment cell separated by a glass frit and connected to a Gamry potentiostat as shown in FIG. 2A. The working electrode was a copper sheet coated with the electrocatalyst. A Pt coil and an Ag/AgCl electrode were used as counter and reference electrodes, respectively. A 20 ml 0.5 M $NaHCO_3$ (Sigma Aldrich, ≥99.5%) aqueous solution was used as electrolyte. Prior to the electrolysis, the electrolyte was saturated with $CO_2$ (99.99%). Then, $CO_2$ was bubbled continuously inside the electrolyte during the reduction process. All tests were carried out at ambient conditions. The samples were analyzed by a headspace gas chromatograph (Agilent technologies-7890A GC system) equipped with mass spectrometer (Inert MSD—with triple axis detector). Compounds were separated on a HP-5, 30 m×0.32 mm×0.25 µm GC column, with an injection and detector temperature of 220 and 250° C., respectively. Helium was used as a carrier gas with a flow rate of 50 ml/min.

Example 3—Characterization of GN/ZnO/$Cu_2O$

Figure 5:
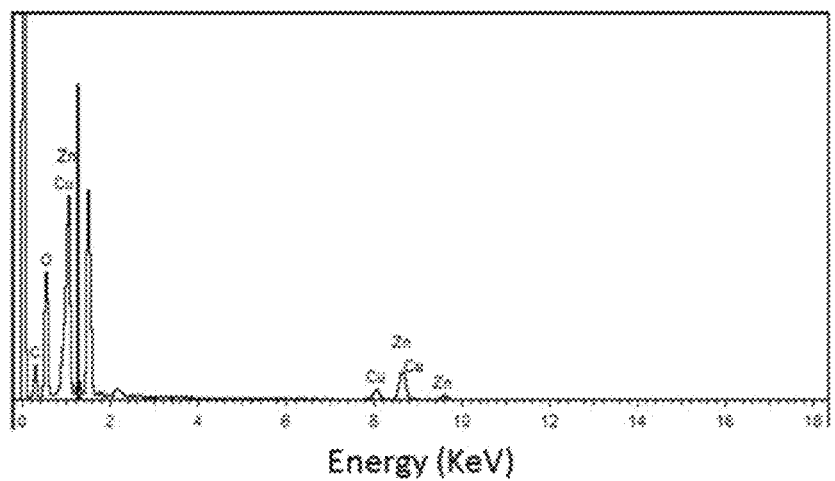
FIG. 5 represents an EDS spectrum of an electrocatalyst including zinc oxide, copper (I) oxide, and graphene, wherein a weight ratio of the zinc oxide to the copper (I) oxide is 1:2.

To demonstrate the successful synthesis of the as-synthesized composites, various analytical techniques were employed. XRD patterns of GN/ZnO/$Cu_2O$ composites with ZnO/$Cu_2O$ weight ratios of 2:1 (denoted as S1) and 1:2 (denoted as S2) is displayed in FIG. 3. The diffraction peaks at 31.7°, 34.3°, 36.2°, 47.4°, 56.5°, 62.7°, and 67.8° with crystal orientations (100), (200), (101), (102), (110), (103), (112), and (201) Planes of ZnO which compatible with hexagonal wurtzite ZnO crystal structure (JCPDS card no. 01-075-1526), respectively [Z. Zhang, L. Ren, W. Han, L. Meng, X. Wei, X. Qi, J. Zhong, Ceram. Int., 41, 2015, 4374-4380; C. T. Hsieh, C. Y. Lin, Y. F. Chen, J. S. Lin, Electrochim. Acta, 111, 2013, 359-365]. And those at 36.4°, 42.3°, 61.3° with reflections (111), (200), and (220) are consistent with the crystal structure of $Cu_2O$ planes (JCPDS card no. 087-2076) [R. A. Geioushy, M. M. Khaled, A. S. Hakeem, K. Alhooshani, C. Basheer, J. Electroanal. Chem., 785 (2017) 138-143; M. Liu, R. Liu, W. Chen, Biosens. Bioelectron., 45 (2013) 206-2.12, incorporated herein by reference in its entirety]. The sharp and narrow. ZnO peaks indicate high crystalline structures. The higher intensities of ZnO peaks in ZnO/$Cu_2O$ (S2) heterostructure imply that the crystalline phase of ZnO has not been affected by increasing the $Cu_2O$ content. The morphology of the as-synthesized ZnO, GN/ZnO, and GN/ZnO/$Cu_2O$ composites were characterized using FE-SEM, and are shown in FIGS. 4A, 4B, 4C, and 4D. The ZnO (synthesized via the same procedure) deposits forming flower-like morphology, have an average particle size around 500 nm as shown in FIG. 4A. Graphene was clearly appeared as transparent layer and the ZnO particles are deposited on both sides forming GN/ZnO hybrid structure as shown in FIG. 4B. FIGS. 4C and 4D show the structure morphology of GN/ZnO/$Cu_2O$ with different ZnO/$Cu_2O$ weight ratios, i.e., S1 and S2 structures. Here, the morphology of tertiary composite (S1 and S2) is different than that of GN/ZnO. It was observed that ZnO deposited as dendrites structure decorated with small particles on its surface. As shown in FIG. 5, the energy dispersive spectrum (EDS) of S2 and S1 (not shown in FIG. 5) samples exhibits the presence of Zn, Cu, and O peaks in the material composition. Also, in S2 sample, Raman G and D bands of graphene structure appeared at 1586 $cm^{-1}$ and 1350 $cm^{-1}$, respectively as shown in FIG. 6A. As can be seen, the D/G intensity ratio in case of S1 or S2 is higher than that of GO, as shown in FIG. 6B. Confirming the removal of oxygen functional groups and hence the reduction of graphene oxide to graphene [Z. Zhang, L. Ren, W. Han, L. Meng, X. Wei, X. Qi, J. Zhong, Ceram. Int. 41 (2015) 4374-4380].

Figure 10:
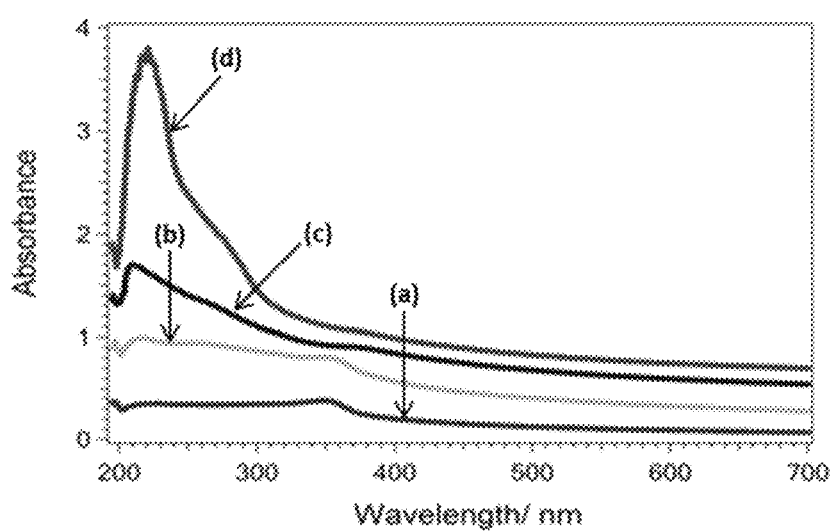
FIG. 10 represents UV-vis absorption spectra of an electrocatalyst including (a) zinc oxide; (b) zinc oxide and graphene; (c) zinc oxide, copper (I) oxide, and graphene, wherein a weight ratio of the zinc oxide to the copper (I) oxide is 2:1; (d) zinc oxide, copper (I) oxide, and graphene, wherein a weight ratio of the zinc oxide to the copper (I) oxide is 1:2.

The absorption edge of ZnO flower-like morphology is located at 360 nm, as shown in FIG. 10. The absorption edge of GN/ZnO was shifted to lower wavelengths by introducing graphene into ZnO [A. A. Ashkarran, B. Mohammadi, Appl. Surf. Sci. 342 (2015) 112-119]. $Cu_2O$ has high and intense absorbance than ZnO, therefore, the effect of introducing $Cu_2O$ into GN/ZnO appeared as broadening peak covers the range from 200 to 300 nm as seen in S1 and S2 samples. There is a big remarkable change occurred with increasing the $Cu_2O$ amount in S2 sample, as the absorption wavelength will be broadened largely [J. Li, H. Li, Y. Xue, H. Fang, W. Wang, Sensors Actuators B Chem. 191 (2014) 619-624]. The surface composition of S2 sample was analyzed by XPS. FIG. 7A shows the binding energies peaks of C 1s at 284.2, 286.5, and 288.4 eV, which were attributed to C—C, C—O, and C=O bands, respectively [C. Luo, D. Li, W. Wu, C. Yu, W. Li, C. Pan, Appl. Catal. B Environ. 166-167 (2015) 217-223]. The O is binding energies at 529.4, 531.9, and 534.8 eV (FIG. 7B), peaks characteristic of Zn—O, OH, and C—O bands, respectively [J. Liu, X. Li, L. Dai, Adv. Mater. 18 (2006) 1740]. FIG. 7C revealed that peaks at 1022.2 and 1045.6 eV were assigned to Zn 2p3/2 and Zn 2p1/2, respectively which agree with the Zn (II) oxidation state for ZnO [J. Ma, K. Wang, L. Li, T. Zhang, Y. Kong, S. Komarneni, Ceram. Int. 41 (2015) 2050-2056]. Moreover, a peak characteristic of Cu 2p3/2 of the Cu (I) oxidation state at 932.2 eV also appeared as shown in FIG. 7D [J. Ma, K. Wang, L. Li, T. Zhang, Y. Kong, S. Komarneni, Ceram. Int. 41 (2015) 2050-2056]. The Cu 2p1/2 peak at 952.6 eV corresponds to Cu (II) oxidation state. However, no CuO peaks were detected by XRD analysis indicates a very trace amount of CuO in the synthesized composites.

Example 4—Electrochemical Activity

Figure 8A:
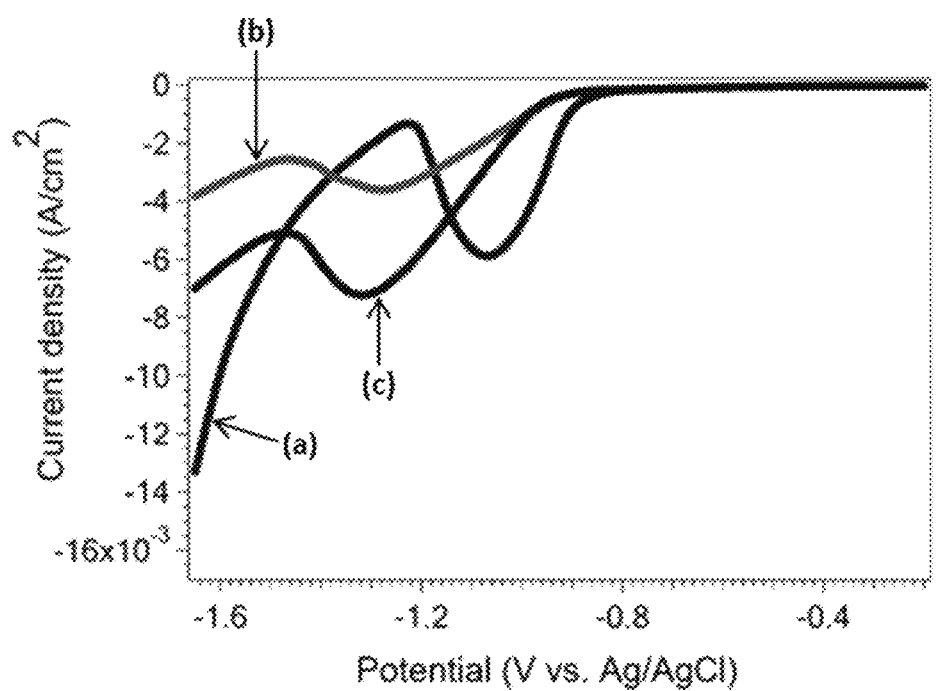
FIG. 8A represents a linear sweep voltammogram from an electrochemical cell at a scan rate of 20 mV/s, wherein the electrochemical cell comprises an electrolyte of $N_2$ saturated 0.5 M $NaHCO_3$ solution, and a working electrode with an electrocatalyst including (a) zinc oxide and graphene; (b) zinc oxide, copper (I) oxide, and graphene, wherein a weight ratio of the zinc oxide to the copper (I) oxide is 2:1; (c) zinc oxide, copper (I) oxide, and graphene, wherein a weight ratio of the zinc oxide to the copper (I) oxide is 1:2.
Figure 8B:
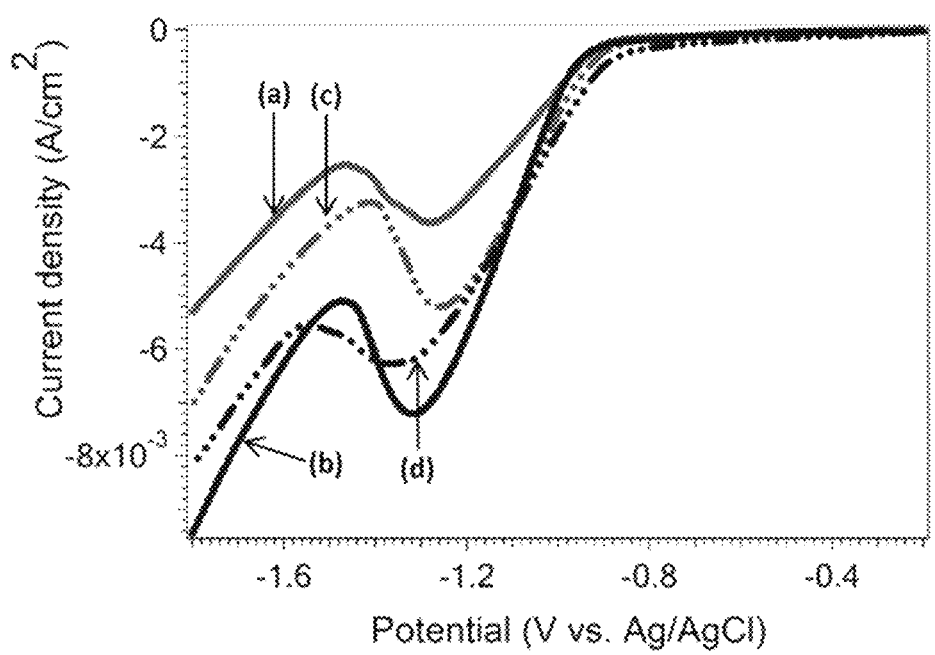
FIG. 8B represents a linear sweep voltammogram from an electrochemical cell at a scan rate of 20 mV/s, wherein the electrochemical cell comprises an electrolyte of $N_2$ saturated 0.5 M $NaHCO_3$ solution, and a working electrode with an electrocatalyst including (a) zinc oxide, copper (I) oxide, and graphene, wherein a weight ratio of the zinc oxide to the copper (I) oxide is 2:1; (b) zinc oxide, copper (I) oxide, and graphene, wherein a weight ratio of the zinc oxide to the copper (I) oxide is 1:2, and wherein the electrochemical cell comprises an electrolyte of $CO_2$ saturated 0.5 M $NaHCO_3$ solution, and a working electrode with an electrocatalyst including (c) zinc oxide, copper (I) oxide, and graphene, wherein a weight ratio of the zinc oxide to the copper (I) oxide is 2:1; (d) zinc oxide, copper (I) oxide, and graphene, wherein a weight ratio of the zinc oxide to the copper (I) oxide is 1:2.
Figure 8C:
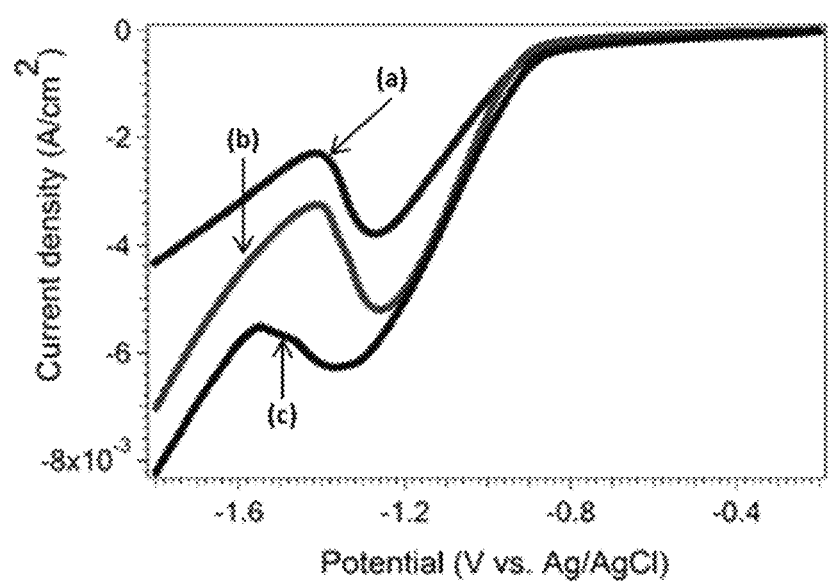
FIG. 8C represents a linear sweep voltammogram from an electrochemical cell at a scan rate of 20 mV/s, wherein the electrochemical cell comprises an electrolyte of $CO_2$ saturated 0.5 M $NaHCO_3$ solution, and a working electrode with an electrocatalyst including (a) zinc oxide and graphene; (b) zinc oxide, copper (I) oxide, and graphene, wherein a weight ratio of the zinc oxide to the copper (I) oxide is 2:1; (c) zinc oxide, copper (I) oxide, and graphene, wherein a weight ratio of the zinc oxide to the copper (I) oxide is 1:2.

FIG. 8A displays the electrochemical behavior of GN/ZnO and GN/ZnO/$Cu_2O$ (S1 and S2)-based electrodes under $N_2$ saturation in the potential range of −0.2 to −1.8 V vs. Ag/AgCl at a scan rate of 20 mV $S^{-1}$. The recorded currents were mainly attributed to hydrogen evolution reaction (HER). Obviously, the reduction peak at −1.0 V for GN/ZnO related to the reduction of Zn(II) to Zn(0). For S1 and S2-based electrodes, a peak at −1.3 V was attributed to the reduction of $Cu_2O$ to $Cu^0$ [R. A. Geioushy, M. M. Khaled, A. S. Hakeem, K. Alhooshani, C. Basheer, J. Electroanal. Chem. 785 (2017) 138-143, incorporated herein by reference in its entirety]. It is clear that the two reduction peaks of Zn(II) and Cu(I) are overlapped as can be seen for S1 and S2 samples. Under $CO_2$ saturation, the cathodic current of the catalyst containing $Cu_2O$ showed significant increase from 4 to 8 mA/$cm^2$ at −1.8 V vs. Ag/AgCl, and the largest current density value was obtained for GN/ZnO/$Cu_2O$ (S2), i.e., as the $Cu_2O$/ZnO weight ratio was decreased, the current density decreased denoting the synergic effect of both oxides in $CO_2$ reduction, as shown in FIG. 8C. S1-based electrode exhibits larger current densities under $CO_2$ than $N_2$ saturation as shown in FIG. 8B. For instance, at −1.8 V the current density value in $CO_2$ saturated electrolyte is 7 mA/$cm^2$ larger than that in $N_2$ saturated electrolyte (5.2 mA/$cm^2$). This difference in the current density value associated with the reduction of $CO_2$ at S1 electrode surface. In contrast, the current density value at S2 electrode under $CO_2$ saturated electrolyte was found to be reduced than that under $N_2$ saturation, indicate the suppression of hydrogen evolution reaction at S2 electrode surface coincides with $CO_2$ reduction. T. Y. Chang et al. observed that $Cu_2O$-catalyzed carbon cloth exhibited lower current value under $CO_2$ saturated electrolyte compared to that under $N_2$ saturation [T. Y. Chang, R. M. Liang, P. W. Wu, J. Y. Chen, Y. C. Hsieh, Mater. Lett. 63 (2009) 1001-1003].

Figure 11A:
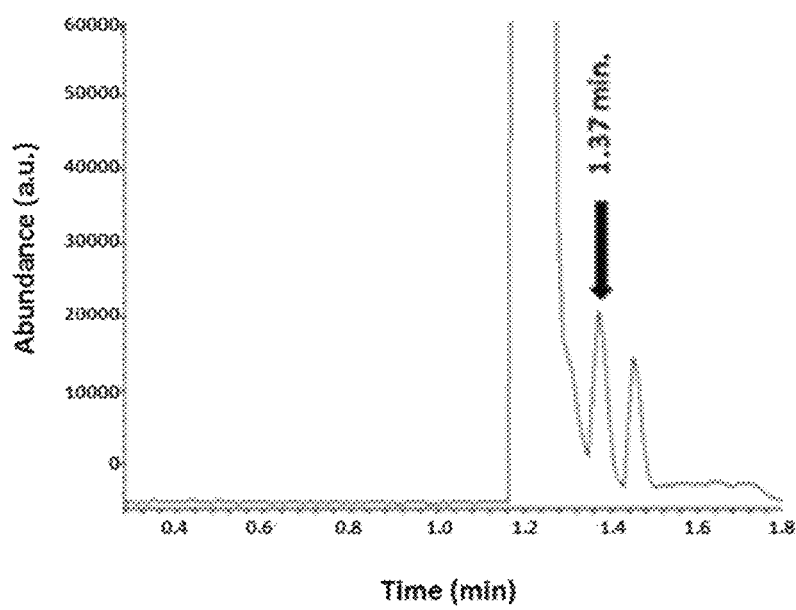
FIG. 11A represents a GC-MS chromatogram of a product of the electrochemical cell that shows a production of n-propanol.
Figure 11B:
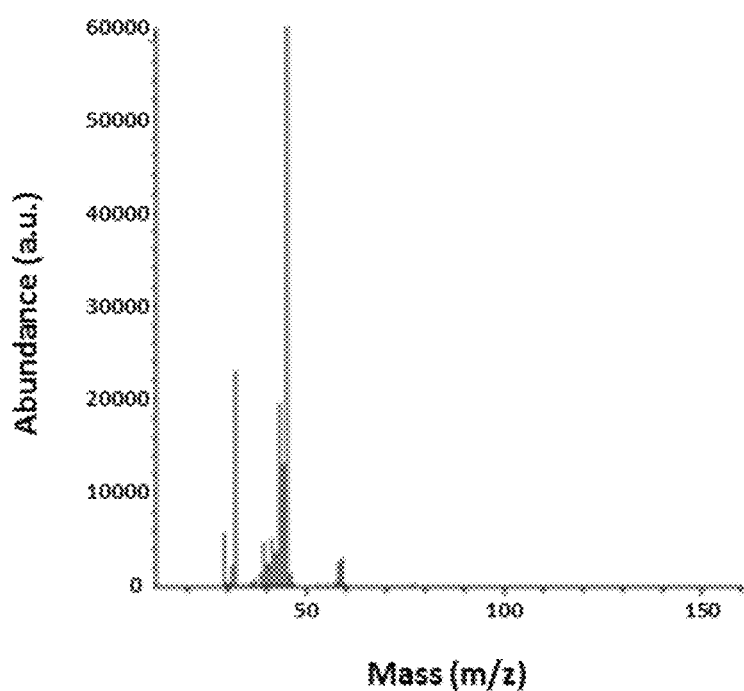
FIG. 11B represents a mass spectrum of the product of the electrochemical cell that shows defragments of n-propanol.

The electro-catalytic activity of GN/ZnO/$Cu_2O$ (S1 and S2) electrodes towards $CO_2$ reduction was carried out at fixed potentials using Chronoamperometry technique. After one hour of $CO_2$ bubbling and 20 min of $CO_2$ reduction, the liquid samples were collected and analyzed by a headspace gas chromatograph (Agilent technologies-7890A GC system). It was found that n-propanol is the dominant product at GN/ZnO/$Cu_2O$ (S1 and S2) surfaces. In comparison, no liquid products have been detected using GN/ZnO electrode under the same conditions. Alcohol ($C_3$) was identified by co-injection with standard samples and their quantifications were accomplished by integrating peak areas using calibration curves. The GC peaks of real and standard samples appear at approximately 1.37 min retention time, as shown in FIG. 11A. The experimental analyses were repeated three times. No other liquid products were detected, suggesting that n-propanol is the only liquid product produced. Table 1 shows the maximum Faradaic efficiency for n-propanol produced using GN/ZnO/$Cu_2O$-based electrodes comparing with some recent reports. FE Calculated assuming that 18 electrons are needed for conversion of $CO_2$ to $C_3$ alcohol.

TABLE 1

Faradaic efficiency of other reported electrochemical cells with different electrodes.

| Electrode | E and/or j | FE (%) | Ref. |
|---|---|---|---|
| Cu nanocrystal | −0.95 V vs. RHE | 10.6 | [D. Ren, N. T. Wong, A. D. Handoko, Y. Huang, B. S. Yeo, J. Phys. Chem. Lett. 2016, 7, 20-24] |
| Cu (100) | −5 mA/$cm^2$ | 1.5 | [Y. Hori, I. Takahashi, O. Koga, N. Hoshi, J. Mol. Catal. A: Chem. 2003, 199, 39-47] |
| Cu(S)-[4 (100) × (111)] | −0.23 mA/$cm^2$* | 4.6 | |
| Cu nanoparticles | −0.4 V vs. RHE | 10 | [C. W. Li, J. Ciston, M. W. Kanan, Nature 2014, 508, 504-507] |
| $Cu_2O$ | 1.39 V vs. Ag/AgCl | 2.4 | [J. Albo, A. Irabien, J. Catal. 343 (2016) 232-239] |
| GN/ZnO/$Cu_2O$ (S1:ZnO/$Cu_2O$ weight ratio of 2:1) | −0.9 V vs. Ag/AgCl | 30 | This work |

TABLE 1-continued

Faradaic efficiency of other reported electrochemical cells with different electrodes.

| Electrode | E and/or j | FE (%) | Ref. |
|---|---|---|---|
| GN/ZnO/Cu$_2$O (S2:ZnO/Cu$_2$O weight ratio of 1:2) | −1.2 V vs. Ag/AgCl | 22 | This work |

*Current density of n-propanol production

FIG. 9 shows the Faradaic efficiency for n-propanol as a function of applied potentials over S1 and S2 surfaces. The maximum Faradaic efficiency (30%) was obtained at −0.9 V over S1 surface, suggesting the strong stabilization of Cu(I) by ZnO. It can be seen that the FE decreased with increasing the applied over-potential at S1 surface, this may be due to the change of the product selectivity of the reaction coincide with the partial reduction of Zn(II). On the other hand, S2 performed high FE of 22% at −1.2 V. This finding matches with the reduced current density recorded at S2 surface under CO$_2$ than N$_2$ saturation at −1.2 V as can be seen in FIG. 8B. In contrast to S1, the increasing of FE with increasing the applied potential (starting from −0.9 to −1.2 V) at S2 surface might be related to the high content of the Cu$_2$O active site. It is reported that, Cu (I) stabilized by ZnO and a strengthening the link between active sites and CO$^-$, and thus result in increased alcohol production selectivity [Y. Kim, T. Trung, S. Yang, S. Kim, H. Lee, ACS Catal. 2016, 6, 1037-1044]. J. Albo et al. have evaluated the performance of Cu$_2$O/ZnO at different weight ratios for CO$_2$ reduction into alcohols [J. Albo, A. Saez, J. Gullon, V. Montiel, A. Irabien, Appl. Catal. B: Environ. 176-177 (2015) 709-717]. Unfortunately, the production rate of alcohol was decreased with increasing the ZnO content and this is due to the coverage of Cu$_2$O by ZnO particles, suggested that Cu$_2$O is supposed to be the active site, and the study revealed the high stability of Cu$_2$O/ZnO comparing to Cu$_2$O surface [J. Albo, A. Irabien, J. Catal. 343 (2016) 232-239; J. Albo, A. Saez, J. Gullon, V. Montiel, A. Irabien, Appl. Catal. B: Environ. 176-177 (2015) 709-717]. In this work, it is clear that ZnO dendrites decorated with Cu$_2$O particles on its surface (S1 and S2 samples) as can be seen from SEM images. Therefore, these results interpret the variation of FE (%) at S1 and S2 surfaces as discussed, and their higher current density than GN/ZnO, as shown in FIG. 8C.

Electrochemically, CO$_2$ is first reduced to C$_1$ intermediates such as CO. Some reports suggested that the C—C coupling of C$_1$ and C$_2$ adsorbed intermediates is the key step in n-propanol production over Cu surface [D. Ren, N. T. Wong, A. D. Handoko, Y. Huang, B. S. Yeo, J. Phys. Chem. Lett. 2016, 7, 20-24; Y. Hori, R. Takahashi, Y. Yoshinami, A. Murata, J. Phys. Chem. B 1997, 101, 7075-7081]. GN/Cu$_2$O revealed a good catalytic activity toward C$_2$ species as investigated by Geioushy et al. [R. A. Geioushy, M. M. Khaled, A. S. Hakeem, K. Alhooshani, C. Basheer, J. Electroanal. Chem. 785 (2017) 138-143, incorporated herein by reference in its entirety]. Therefore, at GN/ZnO/Cu$_2$O surface, an adsorbed C$_2$ intermediate could undergo intermolecular C—C coupling with adjacent C$_1$ species, followed by proton and electron transfer to form n-propanol (C$_3$H$_7$OH).

In summary, an electrocatalyst of graphene/ZnO/Cu$_2$O was synthesized via a simple procedure with varying ZnO/Cu$_2$O weight ratios at low temperatures. The results demonstrate a high catalytic activity of the electrocatalyst towards the electroreduction of CO$_2$ under ambient conditions. The maximum Faradaic efficiency for C$_3$H$_7$OH was 30% at low over-potential (−0.9 V vs Ag/AgCl) using the electrocatalyst with ZnO/Cu$_2$O weight ratio of 2:1, which found to be higher than those values reported in the literature. Thus, the higher FE (%) value was detected at S1 sample, suggesting the strong stabilization of Cu(I) by ZnO for enhancing the activity and selectivity for CO$_2$ reduction.

Thus, the foregoing discussion discloses and describes merely exemplary embodiments of the present invention. As, will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An electrode, comprising:
a conductive substrate; and
an electrocatalyst disposed on the conductive substrate, wherein the electrocatalyst comprises zinc oxide and copper oxide supported on a carbon nanomaterial; wherein the zinc oxide has a dendrite structure and the copper oxide is deposited on the dendrite structure.

2. The electrode of claim 1, wherein the copper oxide is copper (I) oxide.

3. The electrode of claim 1, wherein the carbon nanomaterial is at least one selected from the group consisting of graphene, graphene oxide, reduced graphene oxide, carbon nanotubes, fullerene, nanodiamonds, and nanohorns.

4. The electrode of claim 1, wherein the carbon nanomaterial is graphene.

5. The electrode of claim 1, wherein the carbon nanomaterial is reduced graphene oxide.

6. The electrode of claim 1, wherein the conductive substrate is a copper substrate.

7. The electrode of claim 1,
wherein the carbon nanomaterial is graphene, and
wherein the dendrite structure is deposited on the graphene.

8. The electrode of claim 2, wherein a weight ratio of the zinc oxide to the copper (I) oxide is in the range of 5:1 to 1:5.

9. An electrochemical cell, comprising:
the electrode of claim 1;
a reference electrode; and
a counter electrode,
wherein the reference electrode and the counter electrode are in ionic communication with the electrode via an electrolyte.

10. The electrochemical cell of claim 9, wherein the electrolyte comprises an aqueous sodium bicarbonate solution with a concentration of 0.1 to 5.0 M.

11. The electrochemical cell of claim 9,
wherein the reference electrode comprises silver-silver chloride, and
wherein the counter electrode comprises platinum.

12. A method of fabricating the electrode of claim 1, comprising:
mixing the carbon nanomaterial with water and sonicating to form a suspension;
mixing the suspension with a zinc-containing solution, a copper-containing solution, a surfactant, an alkali hydroxide solution, and a hydroxylammonium halide solution and stirring to form the electrocatalyst in the suspension;
separating the electrocatalyst from the suspension;
mixing the electrocatalyst with a conductive adhesive solution and an organic solvent and sonicating to form a coating precursor; and
coating at least a portion of the coating precursor on the conductive substrate thereby fabricating the electrode.

13. The method of claim 12, wherein the carbon nanomaterial is graphene oxide.

14. The method of claim 12, wherein a molar ratio of zinc in the zinc-containing solution to copper in the copper-containing solution is in the range of 5:1 to 1:5.

15. The method of claim 12,
wherein the zinc-containing solution is an aqueous zinc chloride solution with a concentration of 0.01 to 1.5 M, and
wherein the copper-containing solution is an aqueous copper (II) chloride solution with a concentration of 0.01 to 1.5 M.

16. The method of claim 12,
wherein the surfactant is sodium dodecyl sulfate,
wherein the alkali hydroxide solution is an aqueous sodium hydroxide solution with a concentration of 0.1 to 5.0 M, and
wherein the hydroxylammonium halide is an aqueous hydroxylammonium chloride solution with a concentration of 0.01 to 1.5 M.

17. A process for producing propanol from $CO_2$ with the electrochemical cell of claim 9, comprising:
mixing a $CO_2$ stream with the electrolyte; and
applying a voltage to the electrode and the counter electrode relative to the reference electrode to reduce at least a portion of $CO_2$ present in the electrolyte thereby producing propanol in the electrolyte.

18. The process of claim 17, further comprising:
separating the propanol from the electrolyte.

19. The process of claim 17, which is performed at a temperature of 15 to 35° C., wherein the voltage is in the range of 0.5 to 2.0 volts, and wherein a Faradaic efficiency of producing propanol from $CO_2$ is in the range of 10% to 40%.

* * * * *